(12) United States Patent
Post et al.

(10) Patent No.: US 11,200,869 B1
(45) Date of Patent: Dec. 14, 2021

(54) WEARABLE DISPLAY SYSTEM FOR PORTABLE COMPUTING DEVICES

(71) Applicant: UIPCO, LLC, San Antonio, TX (US)

(72) Inventors: Nathan Lee Post, San Antonio, TX (US); Carlos J P Chavez, San Antonio, TX (US); Deborah Janette Schulz, San Antonio, TX (US); Ashley Raine Philbrick, San Antonio, TX (US); Eric David Schroeder, San Antonio, TX (US); Gabriel Carlos Fernandez, San Antonio, TX (US); Snehal Desai, Richardson, TX (US); Rachel Elizabeth Csabi, Frisco, TX (US); Ruthie D. Lyle, Durham, NC (US); Courtney St. Martin, Duluth, GA (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/834,688

(22) Filed: Mar. 30, 2020

Related U.S. Application Data

(60) Provisional application No. 62/894,074, filed on Aug. 30, 2019.

(51) Int. Cl.
| | |
|---|---|
| *G09G 5/12* | (2006.01) |
| *G06F 3/0485* | (2013.01) |
| *G06F 3/0488* | (2013.01) |
| *G06F 3/0484* | (2013.01) |
| *G09G 5/38* | (2006.01) |
| *G09G 5/377* | (2006.01) |

(52) U.S. Cl.
CPC ............. *G09G 5/12* (2013.01); *G06F 3/0485* (2013.01); *G06F 3/0488* (2013.01); *G06F 3/04845* (2013.01); *G09G 5/377* (2013.01); *G09G 5/38* (2013.01); *G09G 2340/045* (2013.01); *G09G 2340/0464* (2013.01); *G09G 2340/12* (2013.01); *G09G 2354/00* (2013.01)

(58) Field of Classification Search
CPC .. G06F 3/04845; G06F 3/0488; G06F 3/0485; G09G 5/377; G09G 5/38; G09G 5/12; G09G 2340/045; G09G 2340/0464; G02B 27/017
See application file for complete search history.

(56) References Cited

U.S. PATENT DOCUMENTS

| | | | |
|---|---|---|---|
| 2018/0164877 A1* | 6/2018 | Miller | H04B 1/3827 |
| 2020/0073532 A1* | 3/2020 | Sakai | G06F 3/014 |
| 2020/0238177 A1* | 7/2020 | Black | A63F 13/30 |
| 2020/0394012 A1* | 12/2020 | Wright, Jr. | G06F 3/167 |

* cited by examiner

*Primary Examiner* — Abbas I Abdulselam
(74) *Attorney, Agent, or Firm* — Plumsea Law Group, LLC

(57) ABSTRACT

A method and system of providing a wearable expanded display system for portable computing devices is disclosed. The method includes connecting a head-mounted display system to the portable computing device and anchoring a virtual projection of content from the portable computing device to a screen of the portable computing device to provide the user with an augmented reality viewing experience. The virtual projection can present the content in an enlarged view with richer content options than the smaller screen of the portable computing device. The position of the virtual projection will adapt to changes in pose of the screen to maintain the anchored relationship.

19 Claims, 15 Drawing Sheets

WEARABLE DISPLAY SYSTEM FOR PORTABLE COMPUTING DEVICES

TECHNICAL FIELD

The present disclosure generally relates to the presentation of virtual images based on content associated with a portable computing device, and specifically to a method for improving visibility and access to content associated with portable computing devices.

BACKGROUND

This disclosure relates generally to wearable displays that can receive content from other computing devices such as smartwatches, providing users with a mobile virtual and augmented reality experience. Mobile computing devices such as smartwatches by necessity have smaller form factors with smaller screen sizes that are designed for devices typically worn on a person's wrist or that are handheld. Consumers may be reluctant selecting a smaller mobile computing device when faced with the decreased screen size of most smartwatches. These small screens can be associated with user discomfort resulting from the decreased visibility of content offered by the typical watch display.

There is a need in the art for a system and method that addresses the shortcomings discussed above.

SUMMARY

In one aspect, an interactive viewing system for accessing content associated with a portable computing device includes a processor and machine-readable media. The machine-reading media include instructions which, when executed by the processor, cause the processor to connect the portable computing device to a head-mounted display (HMD) system and to receive, at the HMD system, a first content from the portable computing device and information about a pose of a screen of the portable computing device. The instructions further cause the processor to determine the screen has a first pose that is within a field of view of a camera of the HMD system, and to present, at a first position on a display of the HMD system, a virtual projection representing the first content, the virtual projection being presented only when the screen is determined to be in the field of view of the camera.

In another aspect, a method of accessing content associated with a portable computing device includes connecting the portable computing device to a head-mounted display (HMD) system, and then receiving, at the HMD system, a first content from the portable computing device and information about a pose of a screen of the portable computing device. In addition, the method includes determining the screen has a first pose that is within a field of view of a camera of the HMD system, and presenting, at a first position on a display of the HMD system, a virtual projection representing the first content, the virtual projection being presented only when the screen is determined to be in the field of view of the camera.

In another aspect, a system includes means for connecting the portable computing device to a head-mounted display (HMD) system, as well as means for receiving, at the HMD system, a first content from the portable computing device and information about a pose of a screen of the portable computing device. In addition, the system includes means for determining the screen has a first pose that is within a field of view of a camera of the HMD system. Furthermore, the system includes means for presenting, at a first position on a display of the HMD system, a virtual projection representing the first content, the virtual projection being presented only when the screen is determined to be in the field of view of the camera.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
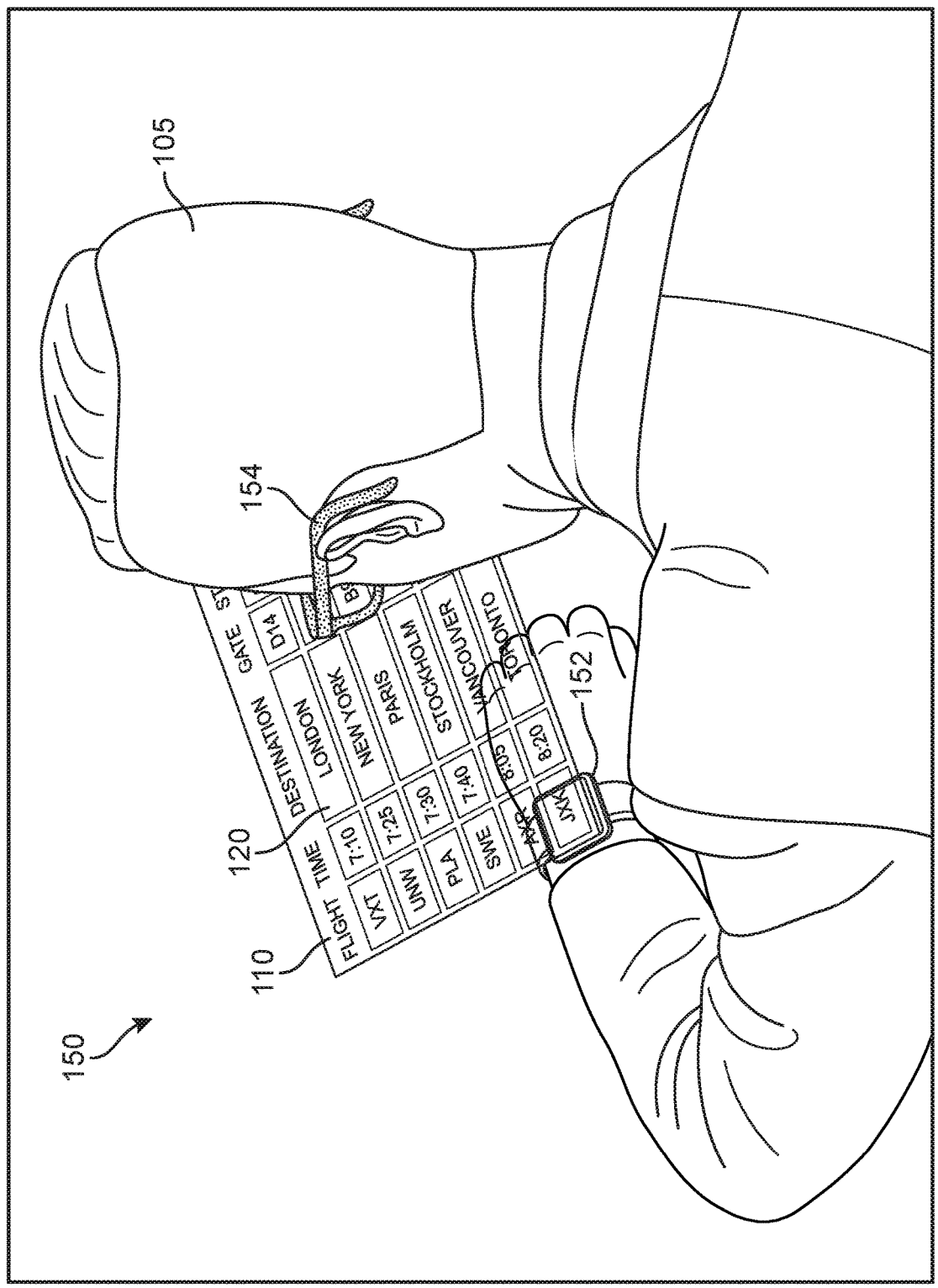
FIG. 1 is an example of a user wearing a head-mounted display (HMD) system and viewing a virtual projection anchored to a screen of a portable computing device, according to an embodiment.

The embodiments provide a method and system to improve access to visual content associated with portable computing devices such as a smartwatches. Specifically, the method and system enable a user to view information from a small screen smartwatch in a large-screen format. While the functionality of mobile computing devices, in particular wearable computing devices such as smartwatches, fitness accessories and like, continues to increase, form factors continue to decrease in size, resulting in further challenges with respect to user interaction and user interface design. For example, a typical smartwatch may include a relatively small touchscreen display and one or more physical input buttons. Such input mechanisms are useful, but can be limited when attempting to engage meaningfully with digital content available via the smart watch. Furthermore, when compared with desktop and even laptop screens, phone screens accommodate significantly less content. Thus, screen size can be a serious limitation for mobile device applications. For example, content displayed on a 30-inch monitor would require five screens on the smaller 4-inch screen typical of a mobile phone. Consequently, mobile device users incur a higher interaction cost in order to access and navigate through the same amount of information. Without improved user interaction input methods, developers and users are required to adapt to content and features that are often too small for human fingers to select with reliable accuracy. As one example, on touch-screen devices, users typically use their fingers to click links and buttons on the screen, which significantly decreases the accuracy of clicks. This is also known as the 'fat finger problem'. Application developers must consider the size and proximity of all clickable elements, ensuring they are of sufficient size to reliably touch with a human finger and far enough apart that users do not accidentally touch the wrong element. Navigation and control bars are of particular importance as they include numerous clickable elements (making accidental clicks more likely) that all have significant consequences to the page (making accidental clicks more critical).

As will be discussed in greater detail below, the proposed systems and methods facilitate such interactions by allowing a user to wear a head-mounted display (HMD) system (also referred to herein as smartglasses, smartgoggles, augmented reality (AR) glasses, or virtual reality (AR) glasses) that is connected to the smartwatch and is configured to show a larger virtual screen that presents the information being accessed from the smartwatch. In some embodiments, the virtually displayed projection ("virtual projection") can be linked or "anchored" to the smartwatch screen, such that the virtual display moves in concert with the smartwatch screen, and in some cases appears to extend outward from the smartwatch screen. The size of the virtual projection can vary based on the type and/or amount of information being presented. Users can physically interact with information on the smartwatch screen, while also interacting with virtual elements displayed by the HMD system. This arrangement can vastly improve user access to the smartphone content. For example, the virtual projection can provide the user with an increased selection of icons, as well as enabling the display of rich content that would not be possible to view on a small watch screen. As part of this arrangement, the smartglasses can receive information from the smartwatch in order to determine what to display. Virtual-based user interactions are then transmitted back to the watch and can change the state of an application running on the smartwatch.

By offering such a convenient visual expansion to the smartwatch display, the smartwatch and other smaller computing devices can be enjoyed by a broader spectrum of consumers, including those who have visual impairments or who otherwise avoid the use of computing devices with small screens due to the type of content they typically access. In addition, users uncomfortable with providing inputs to the smaller device screen can benefit from the opportunity to interact with the smartwatch content through larger hand gestures that permit greater range of motion. This can help reduce or eliminate barriers to digital content access.

Referring now to FIG. 1, for purposes of introduction, a first user 100 of a wearable expanded display computing system ("expanded display system") 150, including a portable computing device ("portable device") 152 and an HMD system 154, is illustrated. In this example, the portable device 152 is a wearable smartwatch and the HMD system 154 is in the form of smartglasses. The HMD system 154 is configured to receive data from the portable device 152 and present the data as a virtual projection 110 to the first user 100. In FIG. 1, the data corresponds to a listing of flight numbers and destinations, which would normally be too dense to usefully view on the relatively small screen of the watch face of the portable device 152.

In general, the portable device 152 of FIG. 1 is worn on the wrist or arm, like a traditional watch, but provides intelligent and interactive features. The display of such a device may be an LCD screen similar to that found in smartphones. The portable device 152 may also provide internet connectivity. The smartwatch is worn around the first user's wrist with the aid of a watchstrap. The portable device 152 further includes an electronics unit 160 comprising a plurality of different components, such as a user interface component (e.g., a touchscreen display), a sensor unit, a user interface module, a processor, and/or a communication module. In some embodiments, the smartwatch may also include a speaker.

In some examples, the user interface component may be coupled to the user interface module, and can include and touch-sensitive components. A wide variety of image sources to provide images for display via the user interface component are known in the art including organic light-emitting diode (OLED) displays, quantum dot based light emitting diodes (QLED) displays, liquid crystal displays (LCDs), or liquid crystal on silicon (LCOS) displays, among others. The display screen may present visual elements to the first user 100. The user interface module can be configured to control the images shown on the screen as well as interact with the touch-sensitive components of the user interface component.

In different embodiments, the touch-sensitive components may sense at least one of a position and a movement of a finger via capacitive sensing, resistance sensing, or a surface acoustic wave process, among other possibilities. The touch-sensitive components may be capable of sensing finger movement in a direction parallel or planar to the touchpad (screen) surface, in a direction normal to the pad surface, or both, and may also be capable of sensing a level of pressure applied to the component surface. In some embodiments, a peripheral edge of the touch-sensitive components may be formed to have a raised, indented, or roughened surface, so as to provide tactile feedback to a user when the user's finger reaches the edge, or other area, of the touch-sensitive components.

Furthermore, in different embodiments, the portable device 152 may also include an on-board computing system including one or more processors and memory. Memory may comprise a non-transitory computer readable medium. Instructions stored within memory may be executed by the one or more processors. The on-board computing system may be configured to receive and analyze data from various sensors associated with the sensor unit in the portable device 152 or data that is communicated to smartwatch 120. In different examples, the sensor unit includes a variety of sensors. The sensors can include one or more of a gyroscope, an accelerometer, a light sensor, an air pressure sensor, a microphone, a speaker, a touch-sensitive sensor, among others. In some cases, the portable device 152 may also include a navigation system equipped with a GPS receiver that can receive GPS information or other receivers capable of receiving global or local positioning information.

A communication module may allow the smartwatch 120 to communicate wirelessly. In different embodiments, the portable device 152 may communicate with a mobile computing device, wireless devices, and/or with networked computers, for example. In FIG. 1, the communication module is connected to the HMD system 154, described below. In addition, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As depicted in FIG. 1, an HMD system 154 allows a user to view a displayed image or a see-through view of the scene in front of the user. While FIG. 1 presents an HMD system comprising a pair of smartglasses, other embodiments can include another wearable computing device such as a smart helmet, smart visor, smart faceshield, smart contact lenses, or other head-mounted display devices. The HMD system is configured to present a combined image that includes both a displayed (virtual) image and a see-through view of the physical environment or real-world scene in front of the user, where the displayed image is overlaid on the see-through view. In different operational modes, an HMD can present the displayed image so that the area of the displayed image is transparent, semitransparent or opaque. In other words, when operating in a transparent mode, the see-through view of the real-world scene is unblocked and an overlaid displayed image can be provided with low contrast. Similarly, when operating in the semitransparent mode, the see-through view of the real-world scene is partially blocked and an overlaid displayed image can be provided with higher contrast. Finally, when operating in the opaque mode, the see-through view of the real-world scene is fully blocked and an overlaid displayed image can be provided with high contrast.

As will be discussed further below, in different embodiments, some HMDs can also provide a see-through display for an augmented reality (AR) view in which real-world scenes are visible to a user but additional image information is overlaid on the real-world scenes. In one embodiment, there can be more than one area in which the display of images over the real-world view occurs. Thus, a displayed image can be viewed by a user at the same time that a view of the scene from the surrounding environment can be viewed. The displayed image (virtual projection) and the real-world view can be viewed as a combined image where the displayed virtual image is overlaid on the see-through view.

In most cases, the HMD system includes a wearable frame with lenses that have display areas and clear areas. The HMD system will also have image sources and associated optics to present image light from the image source to the display areas. When worn, the frame is supported on the user's head with frame arms ("arms"). In some embodiments, the arms can contain electronics such as a processor to drive the displays and peripheral electronics such as batteries and wireless connection(s) to other information sources (for example, through Wi-Fi, Bluetooth, cellular or other wireless technologies). One or more cameras can be included to capture images of the surrounding environment. The locations of the various components in the HMD system can vary in different embodiments. The lens can also include controllable darkening layers in the display areas configured to change the opacity behind the respective portions of the display area, thereby enabling changes in operating mode between transparent, semi-transparent and opaque in the areas where images are displayed. An HMD can provide image information to one eye of the user or both eyes of the user.

A wide variety of HMD systems and image sources to provide images for display are known in the art including organic light-emitting diode (OLED) displays, quantum dot based light emitting diodes (QLED) displays, liquid crystal displays (LCDs), or liquid crystal on silicon (LCOS) displays, among others. In addition, the image sources can be microprojectors or microdisplays with associated optics to present the image light to the display areas for viewing by human eyes. In different embodiments, the optics associated with the image sources relay the image light from the image sources to the display areas, and can include refractive lenses, reflective lenses, mirrors, diffractive lenses, and/or holographic lenses or waveguides.

Figure 2:
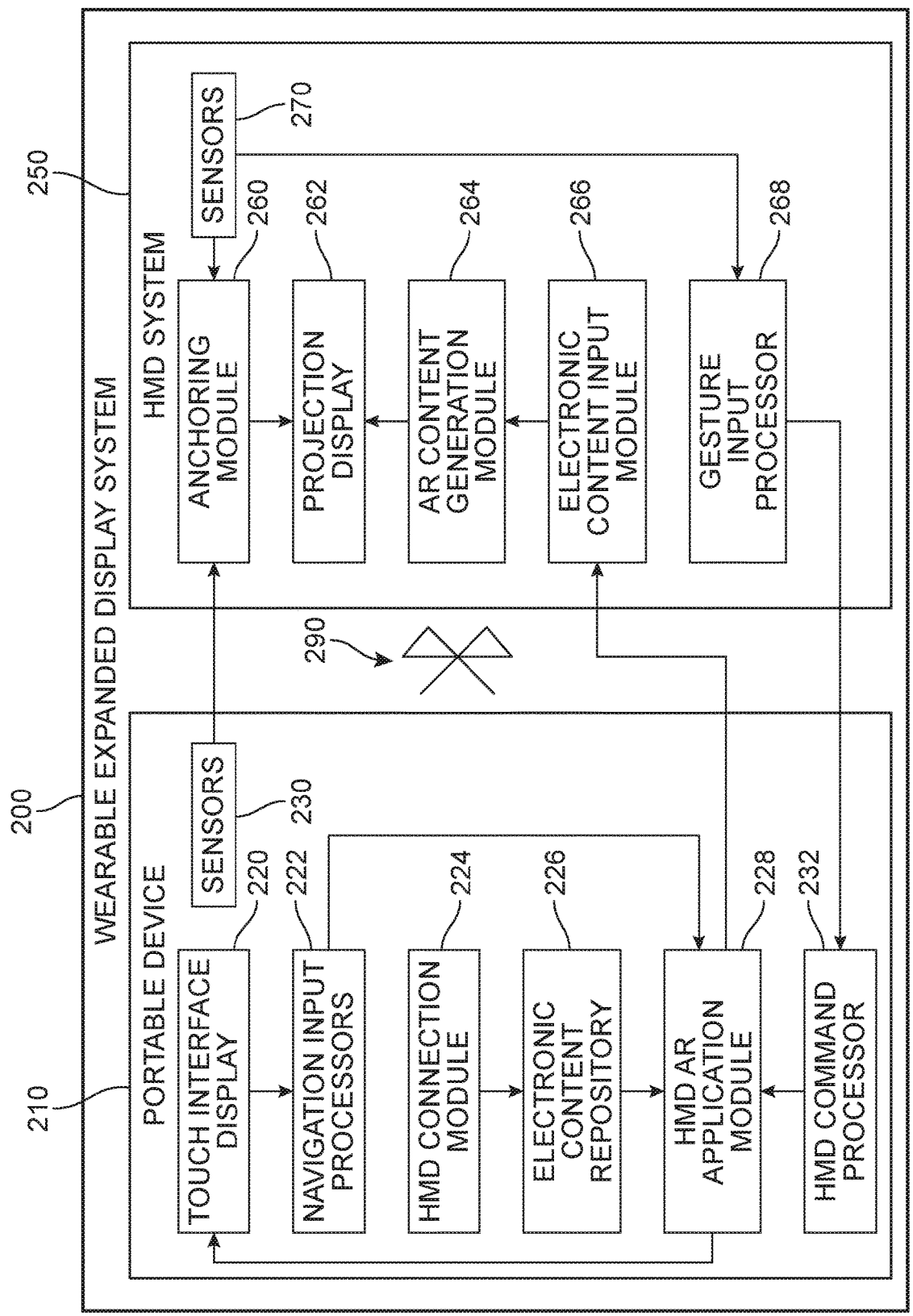
FIG. 2 is a schematic diagram of a wearable expanded display system, according to an embodiment.

In order to provide the reader with a greater appreciation of the embodiments to the reader, FIG. 2 depicts an overview of an embodiment of a wearable expanded display system ("system") 200 in which an HMD system is configured to render a projection comprising a plurality of virtual objects that will be shown adjacent to or on an anchored surface of a portable computing device, thereby providing an augmented reality experience that facilitates access to digital information. As shown in FIG. 2, the system 200 includes a portable computing device ("device") 210 and an HMD system 250 that are configured to communicate with one another, for example via a Bluetooth®, Wi-Fi, cellular, or other wireless connection 290. In one embodiment, the system can also be configured to permit a wired connection, where the user can 'plug in' the HMD system into a port on the device 210 to transfer information between the two components.

The device 210 includes a touch interface display ("touchscreen") 220 as well as a plurality of sensors 230. In addition, the device 210 can access (either via local storage or through a cloud storage service or account) an electronic content repository 226 from which the user can select various electronic content for viewing via touchscreen 220 and/or a projection display 262 of HMD system 250.

As noted above, in some embodiments, the head mounted display (projection display 262) may be semitransparent, thereby enabling the user to view the real-world scene beyond the display, with projected images appearing superimposed or overlaid upon the background scene. Thus, the user may view a scene through a partially transparent HMD where real world objects, like a desk, a table and walls, are partially visible through the HMD which also places virtual objects within the visible scene. The virtual object(s) are anchored to the touchscreen surface. This provides a user with an augmented reality experience in which the user can see the "real world" through the display while simultaneously viewing virtual objects that appear to be fixed in real locations or on real surfaces.

In some embodiments, when the device 210 detects or otherwise determines that a connection and/or activation of a link between the device 210 and HMD system 250 has been initiated (via HMD connection module 224) the electronic content that is currently selected can be conveyed to an HMD augmented reality (AR) application module 228, which will prepare the content for expanded display via system 200 rather than solely through the touchscreen 220. In other words, the content presentation will differ when viewed on the touchscreen 220 than when viewed through the HMD system 250. This reconfigured content is sent to an electronic content input module 266 of the HMD system 250, which provides the data to an AR content generation module 264 for virtual rendering via projection display 262 as one or more virtual objects.

The projection of virtual objects anchored at/on the touchscreen of the device 210 can create the experience of an augmented reality and facilitate user interactions with the virtual objects. In different embodiments, the virtual object(s) rendered on projection display 262 representing the electronic content selected on the device 210 are anchored to the device 210 in the real-world (see FIGS. 13A and 13B) via anchoring module 260. Thus, a virtual object may resemble a flat screen monitor or TV that is 'tethered' to the real-world object (here, the device 210). In one embodiment, the projection appears to extend outward from the touchscreen, as if the touchscreen has expanded or become enlarged. In many cases, the projection can be anchored in such a manner that a corner or peripheral portion of the projection is overlaid on the touchscreen, and the remainder of the projection extends into the space adjacent to the touchscreen.

In addition, in different embodiments, the image(s) shown on the touchscreen when the virtual projection is anchored to the device can vary from what is normally shown on the touchscreen. As one example, the touchscreen can display a portion of the electronic content such that the virtual projection appears to be extended in a continuous manner from the touchscreen. In other words, the two aspects (virtual projection and touchscreen) can be viewed by a user and appear to comprise a single 'flatscreen' image display, like two interlocking display pieces. Depending on where the touchscreen is anchored relative to the virtual projection, the image shown can change to match the portion of the projection that corresponds to that location. In other embodiments, the touchscreen can instead present additional options for interacting with the virtual projection. For example, the touchscreen can display arrows or other indicators to provide guidance to a user. The indicators can remind the user that swiping motions on the touchscreen will be received as inputs directed to the virtual projection, such as to request a scrolling through of the content being shown.

Furthermore, the size and/or dimensions of the projection in relation to the touchscreen can vary in accordance with the type of content being displayed. For example, media such as photos and video can be projected in landscape view, while text-based information can be projected in portrait view. These can be associated with default settings, or can be selected by the user. In different embodiments, the dimensions can be increased by the user to allow for the display of additional portions of the content or decreased to reduce the display of content. For example, a user may adjust the apparent length of a projection to display additional items in a list.

As the user moves his or her head, the virtual object appears to remain attached to or on the anchor surface (in this case, the touchscreen 220) rather than moving with the user's change of view. Anchoring module 260 receives data from sensors 230 of device 210 and sensors 270 of HMD system 250 to determine the pose of the device 210 and make adjustments to the projection of the virtual object(s) accordingly, in a manner consistent with the anchoring relationship.

In different embodiments, a virtual object presented by the HMD system 250 via projection display 262 may include, for example, text, graphics, images and 3D shapes, as well as and digital assets (documents, pictures, videos, text, television channels, movies, document word processing applications, email, video, telephone calls, social network postings, RSS feeds, and other media). A processor for the HMD system 250 continuously updates the displayed image of the generated virtual projection to so that the virtual objects appear to remain anchored to the watch face even as the user turns their head or moves through their physical environment and/or changes position of their arm wearing the device 210. As the user moves and walks around the real-world scene, the virtual projection thereby appears to stay tethered to the touchscreen 220. In different embodiments, toward maintaining this appearance, the processor can modify the appearance of the virtual object(s) so that their shapes, sizes, and orientations match the user's viewing perspective of the device 210.

Either or both of sensors 230 and 270 can include orientation sensors, such as cameras, accelerometers, gyroscopes, magnetic sensors, optical sensors, mechanical or electronic level sensors, and inertial sensors which alone or in combination can provide data to the processors for device 210 and HMD system 250 regarding the up/down/level orientation of either device (for example, by sensing the gravity force orientation) and also the user's head position/orientation (and from that viewing perspective). In addition, sensors 230 and 270 may include rotational orientation sensors, such as an electronic compass and accelerometers, that can provide data to the device's processor regarding left/right orientation and movement.

In different embodiments, images may be captured by a camera associated with the HMD system. In some embodiments, these images are used to generate image data that a processor can analyze to estimate distances to objects in the image, while in other implementations, the HMD system can include one or more distance measuring sensors such as a laser or sonic range finder can measure distances to various surfaces within the image. Different types of distance measuring sensors and algorithms may be used an imaged scene to measure for measuring distances to objects within a scene viewed by a user. Furthermore, more than one sensor and type of sensor may be used by HMD system 250 to determine distance.

The system 200 also includes provisions for receiving user inputs and executing commands via either the HMD system 250 or the device 210. For example, system 210 may be configured to recognize user inputs, which may be made through hand gestures or other body movements or user interactions. These inputs and other position and distance related data are captured by the sensors 230 and 270. In one example, a user input can comprise a button press, a specific gesture performed in view of the camera, a gaze-direction or other eye tracking movement by the user, a voice activation, or other recognizable input made in proximity to the presented virtual objects and digital assets, received via cameras of the HMD system (see FIGS. 6 and 7). In some embodiments, a set of gestures may be stored or organized in the form of a gesture dictionary that stores movement data or patterns for recognizing gestures, including but not limited to finger-based pokes, pats, taps, pushes, guiding, flicks, turning, rotating, drawing, as well as larger scale grabbing and pulling, two hands with palms open for panning images, sign language or otherwise forming shapes with fingers, and swipes. These gestures can be provided in close proximity to, or in the direction of the apparent location of a virtual object and recognized by a gesture input processor 268. The gesture or other input to the HMD system 250 by the user can be sent to an HMD command processor 232 for execution of the command assigned to the recognized input. In some embodiments, the commands may be used to alter or affect the output of HMD AR application module 228 and/or the update the corresponding content stored in electronic content repository 226.

Similarly, as discussed below in FIGS. 8 and 9, input received via the touchscreen 220 can be recognized as commands for navigation of the virtual projection, processed by a navigation input processor 222, which is configured to adjust the information generated by the HMD AR application module 228 accordingly. For example, a swipe in an upward direction on the touchscreen can cause a signal to be transmitted to the HMD system to scroll the virtual content upward, while a swipe in a downward direction on the touchscreen can cause a signal to be transmitted to the HMD system to scroll the virtual content downward. Similarly, a swipe in a leftward direction on the touchscreen can cause a signal to be transmitted to the HMD system to scroll left, and a swipe in a rightward direction on the touchscreen can cause a signal to be transmitted to the HMD system to scroll right. In some embodiments, other types of commands can be triggered via the touchscreen. In one example, a 'pinch' can decrease the apparent size of the virtual objects, and a splaying outward of the same fingers can increase the apparent size of the virtual objects. In another example, a user input can be received via the touchscreen interface in the form of a tap or press and, in response, the HMD system can minimize or deactivate the virtual projection in response to the user tap input and in response to a subsequent tap or press on the touchscreen, maximize or reactivate the virtual projection. In this way, the user can easily remove the presentation of the virtual projection from the display in order to fully engage with their physical environment and/or access content via their smartwatch normally while continuing to wear the HMD, and also quickly return to a viewing of their virtual projection.

Figure 3:
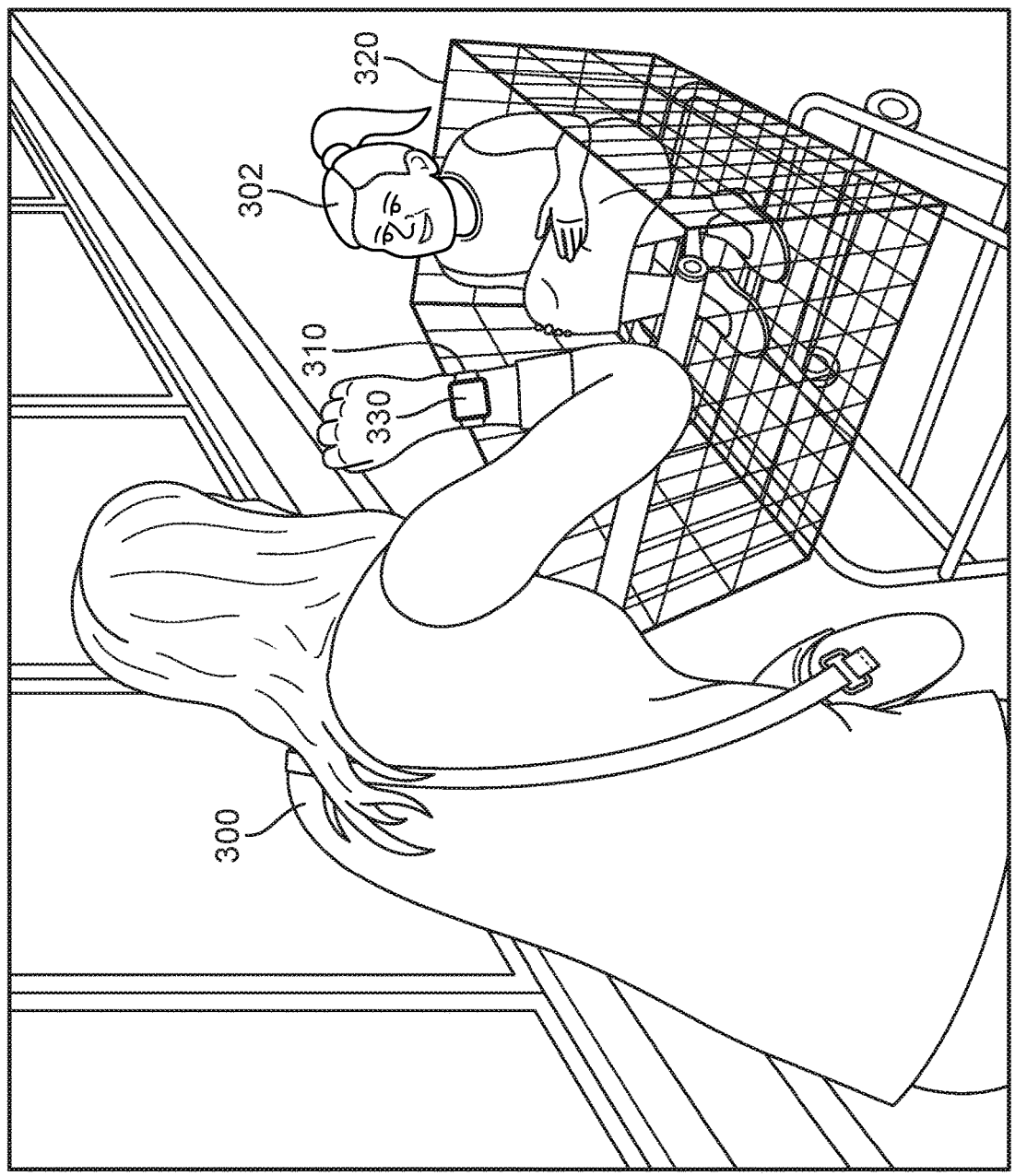
FIG. 3 is an illustration of a user wearing a smartwatch while shopping at a store, according to an embodiment.

Referring now to FIGS. 3-9, a sequence of drawings illustrates an example of a use of a wearable expanded display system ("system") during everyday activities. In FIG. 3, a second user 300 is pushing a shopping cart 320 with her child 302 as she browses items at a grocery store. The second user 300 is wearing a smartwatch 310 on her wrist. During her shopping trip, the second user 300 may wish to review a shopping list that she had previously made or was provided with and either already stored on her smartwatch 310 or now accesses from a remote location via a cellular network or Wi-Fi connection. However, as the list includes multiple items, it is not easy or efficient to see on a watch face (screen) 330 of the smartwatch 310, as the smaller screen is not conducive to viewing the list as a whole, or quickly moving from one item at the top of the list to another item toward the bottom of the list.

Figure 4B:
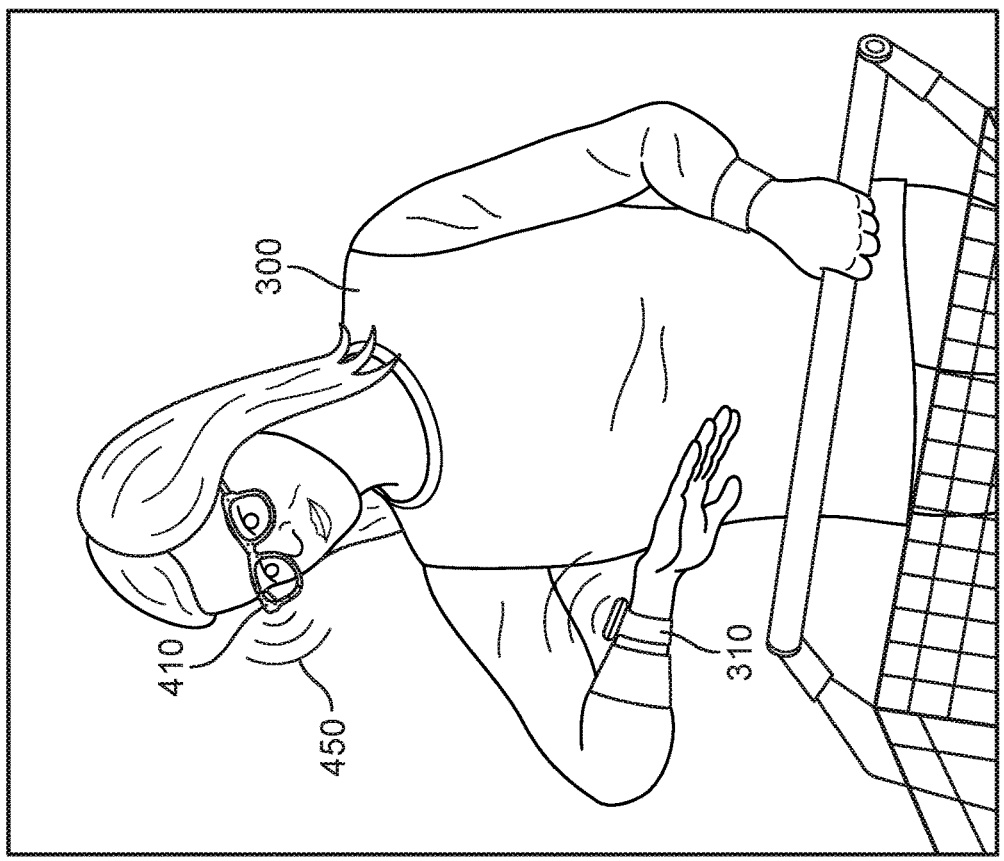
FIG. 4B is an illustration of the user of FIG. 3 wearing both the smartwatch and smartglasses and connecting the two devices, according to an embodiment.
Figure 4A:
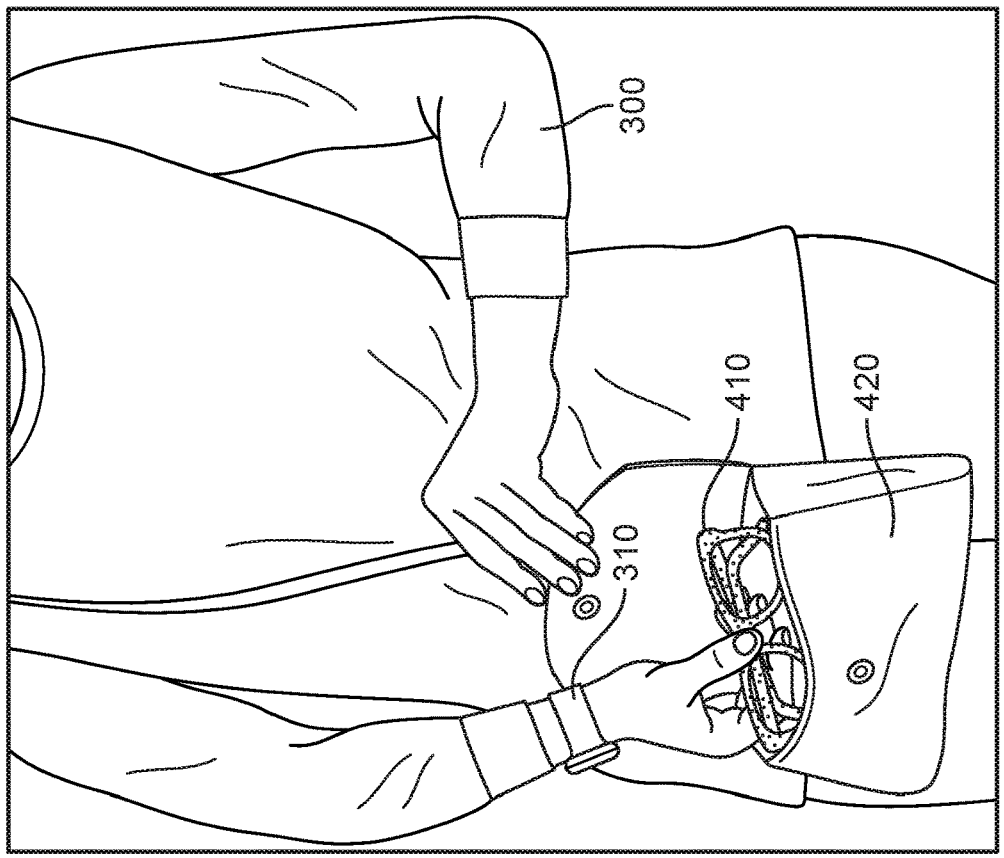
FIG. 4A is an illustration of the user of FIG. 3 reaching for a pair of smartglasses, according to an embodiment.

In FIG. 4A, the second user 300 is shown removing a set of smartglasses 410 (or other type of HMD) from her purse 420. The smartglasses 410, being portable, lightweight, and compact, are easy to bring along throughout the second user's day-to-day routine activities. The smartglasses 410 are mounted on the head of the second user 410 in FIG. 4B, and have been powered on to begin the process of initiating a connection 450 or pairing between the smartglasses 410 and the smartwatch 310. Once the two devices are connected, information can be shared and transmitted. In some embodiments, the smartglasses 410 can remain see-through or transparent until the second user 300 engages or activates a display expansion mode whereby the smartwatch screen appears to be extended or enlarged via the smartglasses' augmentation. For example, a translucent or opaque user interface may be projected onto the real-world scene in response to a user selection or other user input to the smartwatch 310 settings and/or one or more applications running on the smartwatch 310.

Figure 5:
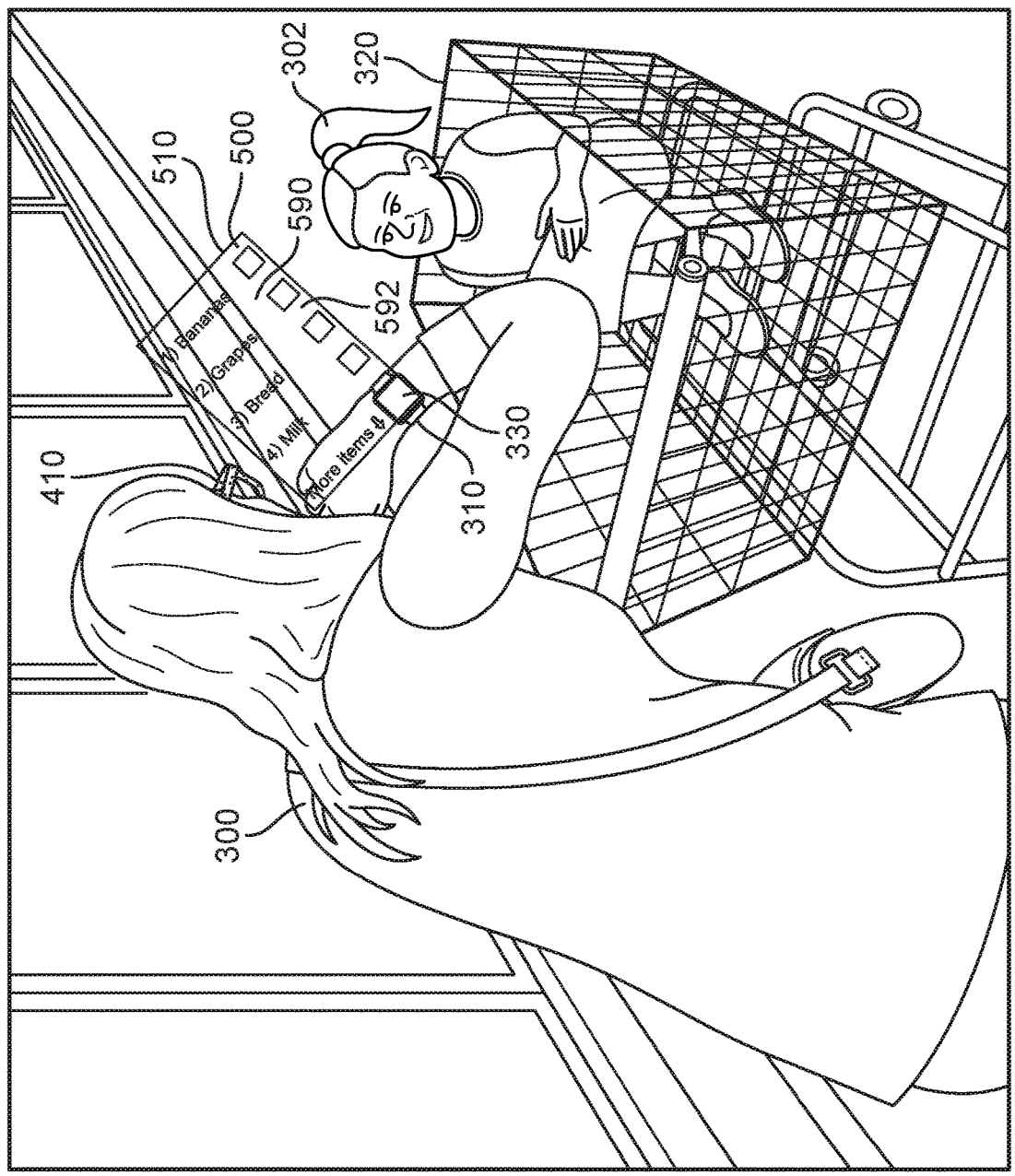
FIG. 5 is an illustration of the user of FIG. 3 viewing a virtual projection comprising a first portion of a shopping list that appears to extend from the screen of the smartwatch while shopping at a store, according to an embodiment.

Once a link is established between the two devices, the second user 300 can select a desired electronic content item available via the smartwatch interface to view through the smartglasses 410, or currently accessed content on the smartwatch will be automatically presented via the smartglasses 410. In the example of FIG. 5, the second user 300 has accessed a first electronic content item ("first content") 500 stored on her smartwatch 410 and requested presentation of the first content 500 on her smartglasses display. A virtual projection (also referred to herein as a virtual user interface) 510 is depicted in FIG. 5 comprising a visual representation of the first content 500 that has been overlaid on the real-world scene around her. The virtual projection 510 includes a virtual interface with a substantially rectangular shape. In other embodiments, the interface can change in size and/or shape to best accommodate the type of information (i.e., a list, photos, images, documents, video, etc.) conveyed by first content 500. In this case, the first content 500 has been rendered as a virtual projection of a first portion 592 of a shopping list 590, presented in large font and double spacing as well as with selectable options adjacent to each shopping list item. In some embodiments, each item can include an image such as a photo or drawing of one or more listed items next to the item to help the user more easily identify the item, and/or a note providing more detail about the item or its location in the store. Thus, the second user 300 is able to view, hands-free, her shopping list 590, while continuing to easily navigate through the real-world environment of a grocery store, and also attending to her child 302 and shopping cart 320 without interruption.

Although not shown in FIG. 5, it may be appreciated that in different embodiments, the system can be configured such that electronic content is rendered differently when presented by the HMD system than when presented on the screen of the portable device. In some embodiments, the use of the HMD can enable the display of rich content that would otherwise be unavailable, abridged, or minimized during display directly on the portable device. Thus, the proposed system can improve the appearance and readability of a content item. For example, an application configured to create, modify, and/or store reminders, tasks, alarms, or calendar items can present a first rendering of a first content on a smartwatch screen that is limited to textual content and present a second, different rendering of the first content on the HMD system that includes both image and textual content and is formatted for high readability and clear, distinct selections of options. Text can be larger, more information may be presented, a wider range of colors and stylization can be applied to the information, and spacing between content portions can be increased. As one example, an application or website may be configured for compressed or text-only display on the smaller watch screen, but then be presented in fully expressed or otherwise present a richer rendering of the content when viewed through the smartglasses virtual display.

Furthermore, as noted above, because the display of information is overlaid on the real-world scene, a user may attend to the information without losing awareness of their surroundings. The contrast of the displayed virtual projection can also be adjusted to correspond the desired level of visual diversion. For example, the user may increase the contrast or 'solidity' of the virtual projection when attention to their outward physical environment is unnecessary or undesired, and decrease the contrast (increasing the degree of transparency) when it is likely that their attention will need to be distributed between both the real-world and the information provided by the virtual projection.

Figure 6:
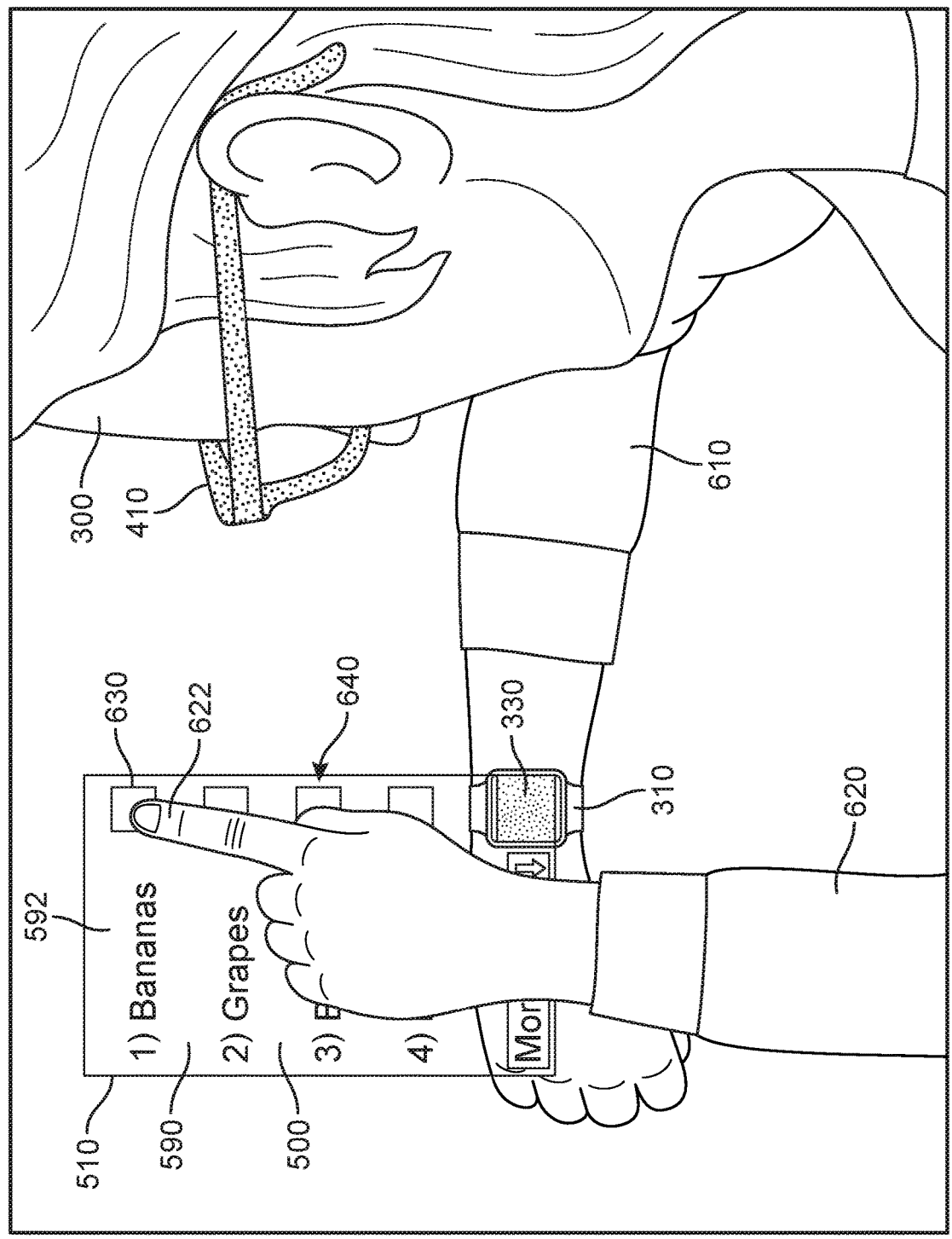
FIG. 6 is an illustration of the user of FIG. 5 interacting with the virtual projection by providing a gesture-based input to the smartglasses, according to an embodiment.
Figure 7:
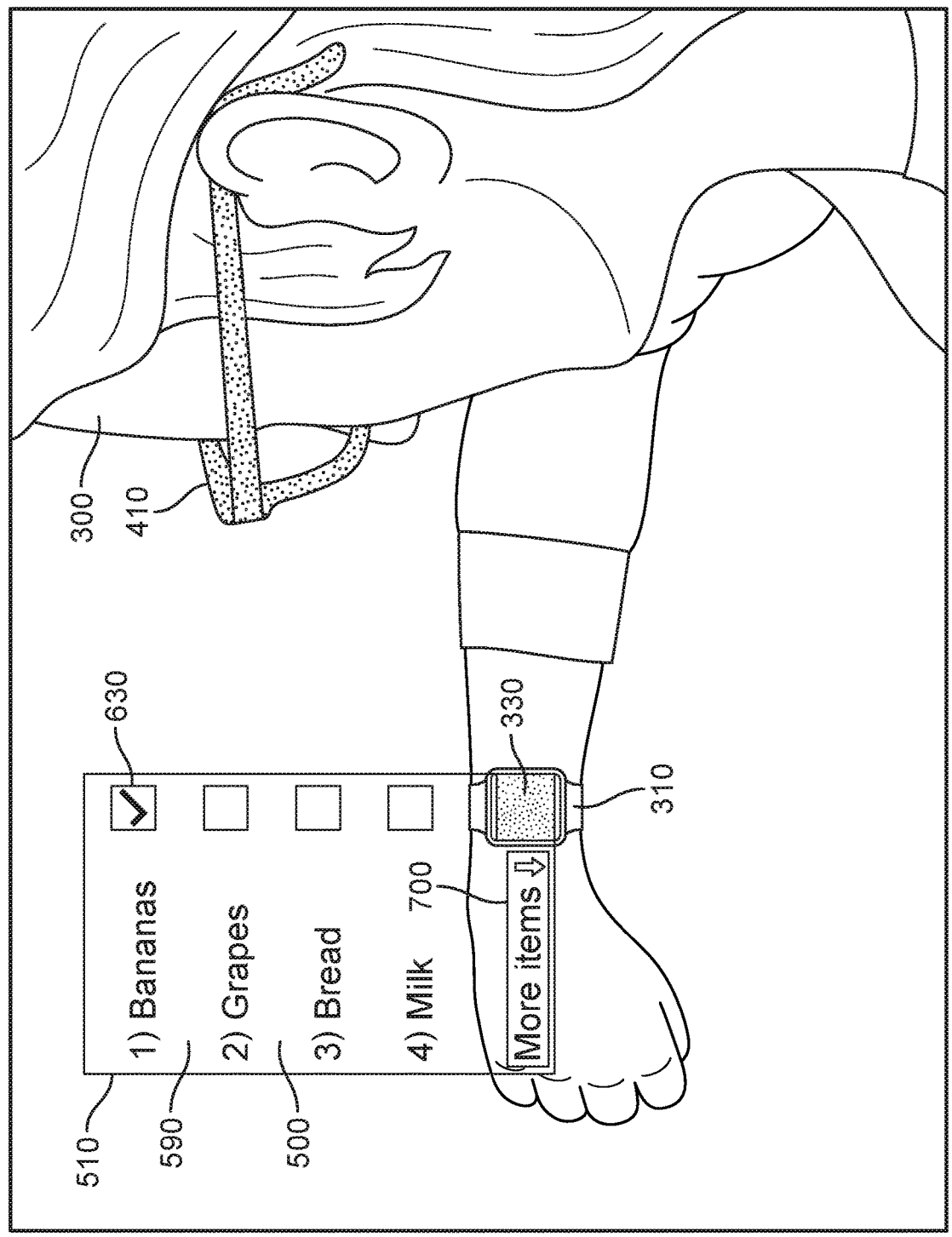
FIG. 7 is an illustration of the user of FIG. 6 viewing the shopping list where one item is now presented as checked off in response to the gesture-based input, according to an embodiment.

In different embodiments, the system can include provisions to receive user inputs and otherwise allow the user to engage with the presented content. In FIG. 6, the second user 300 reviews the first portion 592 of the shopping list 590, where the virtual projection 510 is anchored to the smartwatch 310 worn on her right wrist. The anchoring feature will be discussed in greater detail with respect to FIGS. 13A and 13B. In the example of FIG. 6, it can be seen that each shopping list item includes a selectable option 640 corresponding to a checkbox. The second user 300 is shown raising her left arm 620 and making a tapping gesture onto a first region of the virtual user interface appearing to correspond to a first selectable option 630 associated with a first list item ("Bananas"). The system is configured to detect this type of gesture and determine if the tap(s) were associated with a region of the display on which a selectable option was shown. In this case, as depicted in FIG. 7, the tapping gesture is received by the system as a selection of the first selectable option 630. In response, the virtual projection 510 is updated to show a checkmark on the checkbox. This input and resulting change to the shopping list 590 can also be reflected in the record of first content 500 stored in smartwatch 410 and any other cloud storage or application account in which that the smartwatch may be configured to store information, such that any subsequent access of the first content 500 (for example, directly via the smartwatch screen, or via a desktop connected to the cloud storage account) will show the first item having been checked off. In other words, in some embodiments, all changes, including additions, deletions, and/or modifications made to the data through the interface offered by the smartglasses 410 will be reflected in the 'home' data file location from which the data is being supplied or where the user has configured the system to store and transmit the data.

In different embodiments, the system can be configured to recognize a body part (such as a hand) in the images captured by cameras associated with the smartglasses, as well as movements tracked over a predetermined time interval for that body part. For example, as shown in FIG. 7, if the system recognizes that the user's hand and the fingers are positioned in front of the smartglasses mounted camera with one finger outstretched and four fingers are folded downwardly toward a palm of the user, the system may determine (e.g., by comparing this orientation of the user's hand and fingers to a gesture dictionary) that the that the user is 'pointing' or 'tapping' and expressing a desire for the system to take an action. A gesture dictionary may include gesture data for movements that may include tapping, patting, poking, pushing, guiding, flicking, turning, rotating, grabbing and pulling, and other gestures, such as forming shapes with fingers (e.g., an "OK" sign), and/or swipes, all of which can be linked to a specific option or action based on the close proximity of the gesture to the apparent location of a virtual object in a generated display. If a gesture is detected, the system may process an input command that corresponds to the recognized gesture and that may be executed by the processor. As some examples, the gesture dictionary may be configured to interpret poking, patting, and/or tapping as a target selection (as shown in FIG. 7), while other gestures such as a push gesture can guide a screen object across a screen. Similarly, a flick gesture can be used to impart momentum to the screen object, a turn gesture can rotate the proximate screen object, a grab/pull gesture can zoom in or out, a gesture where two hands move in and out can resize or pan around an object, and a swipe gesture may be used for vertical or horizontal scrolling, or shuttling through a series or sequence of media (e.g., in a slideshow).

Also shown in FIG. 7, the first portion 592 of the shopping list 590 can be seen to include a first indicator 700 of additional content associated with the first content 500 that may be available for viewing by the second user 300. In this specific example, this serves as a notice to the user that the shopping list 590 extends further beyond what is currently displayed by the smartglasses 510. As noted earlier, in some embodiments, various hand gestures can be interpreted by the system as requests to the system to execute a specific task or action. In one example, a user may swipe across the virtual projection 510 to scroll through (up/down, left/right) the first content 500. However, in many cases, as users move through public spaces like retail shopping centers, libraries, office spaces, or smaller areas that make large sweeping gestures difficult or prohibitive, the user may be reluctant or unable to engage in large scale motions of their arms or hands that make them 'stand out' or are distracting and/or disruptive to others. In addition, some users may not feel comfortable using virtual freeform gestures, and desire the sensation of a solid, physical interface, even while viewing information virtually. In some other cases, a user may not be physically comfortable or able to make larger, gross motor control type movements. In order to address these aspects, the system can be configured, in different embodiments, to instead receive inputs via the smartwatch touchscreen that are directed to virtually projected information being viewed through the smartglasses. In other words, the smartwatch touchscreen can serve as a touchpad, touch panel, or trackpad that can register small, incremental, fine motor control-type inputs for navigation through and/or selection of various virtual objects.

Figure 8:
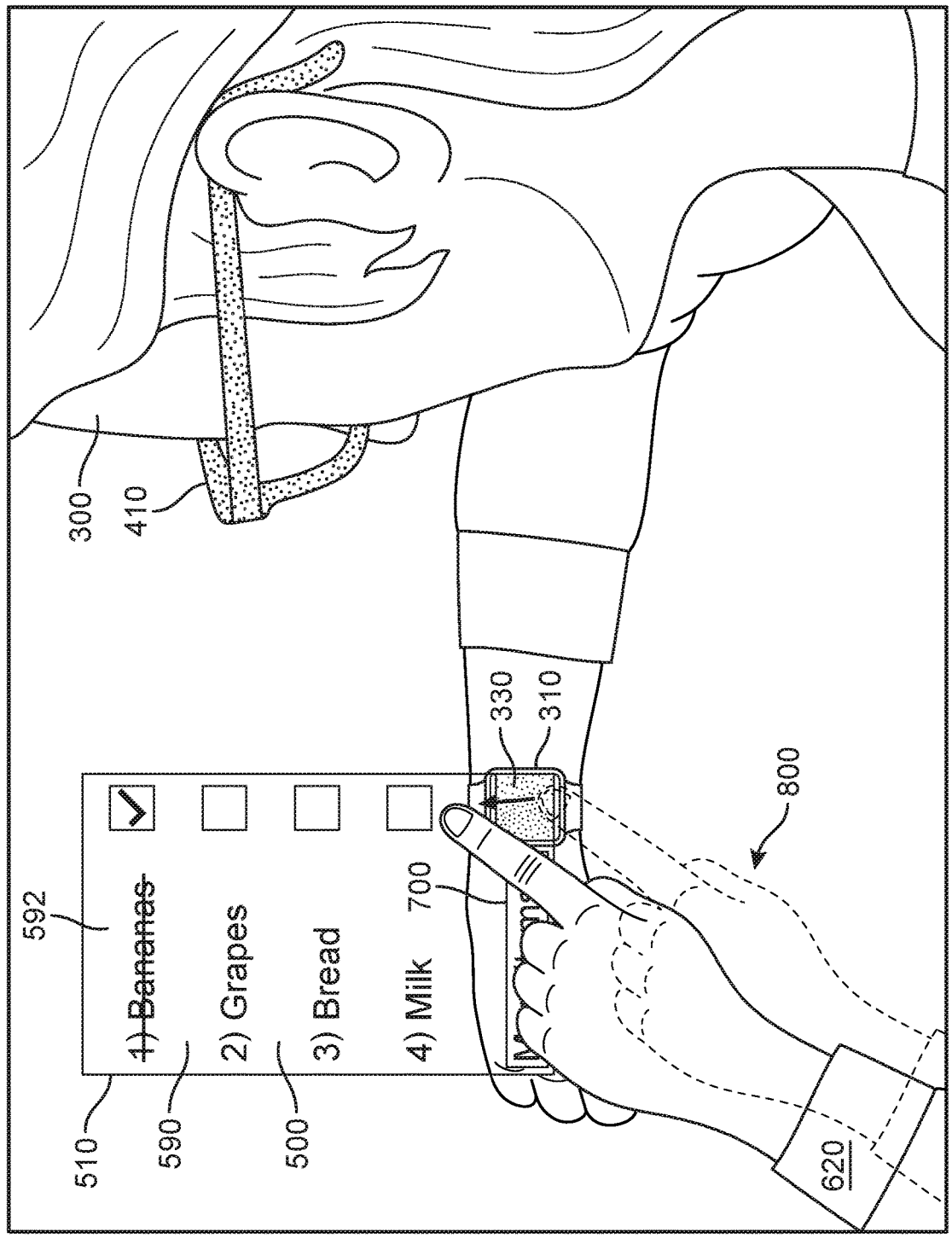
FIG. 8 is an illustration of the user of FIG. 7 providing a touch-based input via the screen of the smartwatch in order to navigate through the virtual projection, according to an embodiment.
Figure 9:
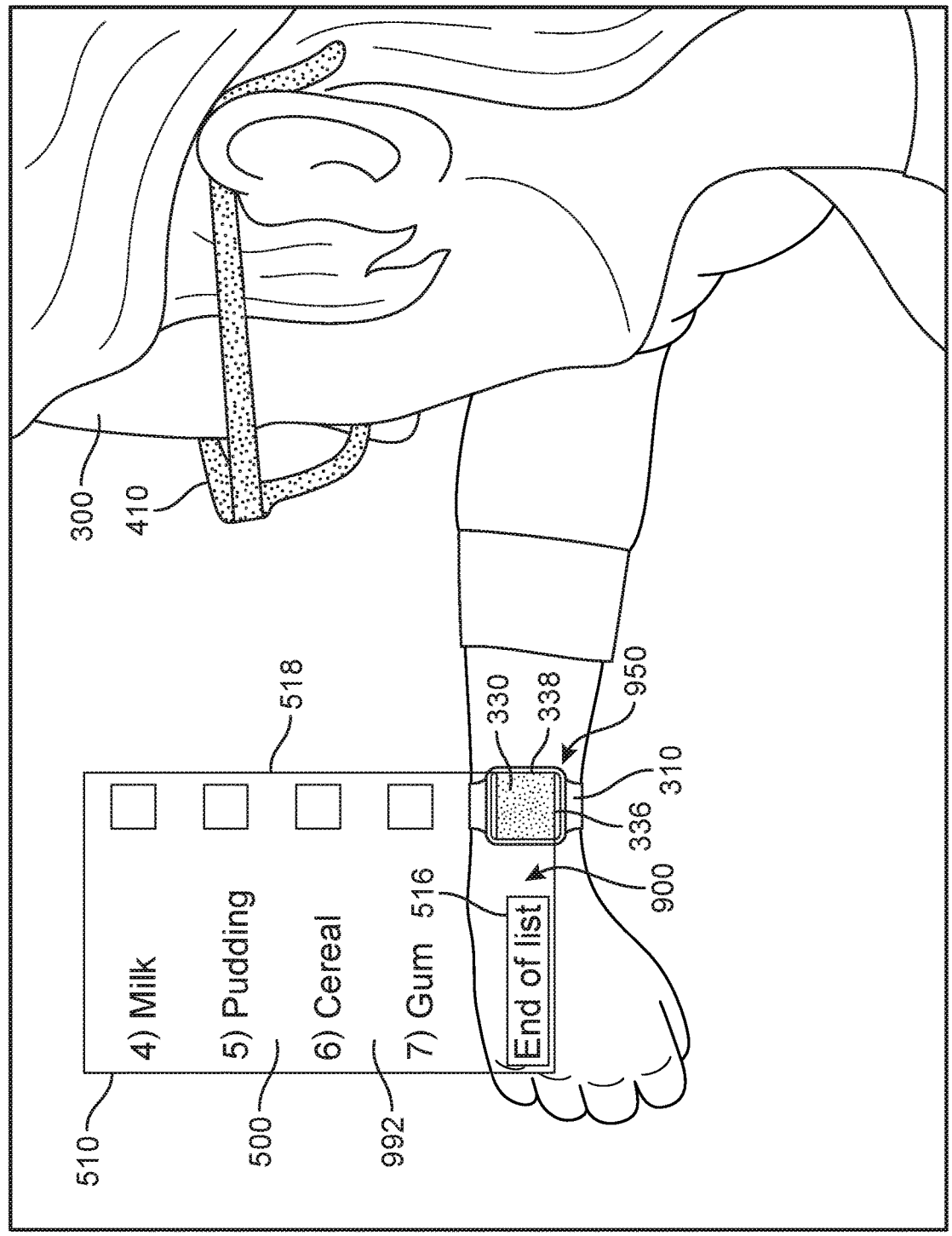
FIG. 9 is an illustration of the user of FIG. 8 viewing a second portion of the shopping list in response to the touch-based input, according to an embodiment.

Referring to FIG. 8, the second user 300 is again reviewing the first portion 592 of the shopping list 590, where the virtual projection 510 is anchored to the smartwatch 310 worn on her right wrist. In this example, the second user 300 is also shown raising her left arm 620. However, in this case, the second user 300 proceeds to make contact with the watch face 330 of her smartwatch 410, which also functions as a touchscreen interface. In other words, in different embodiments, the smartwatch is configured to detect position coordinates and a pressure value of a touch operation of a user. For example, touch operations may be performed by touching the touchscreen by using an appropriate part or object such as a finger or a stylus. In one embodiment, the touchscreen includes a touch-sensitive surface as well as serving as a display. The touch-sensitive surface is used to perform various operations related to detection of contact, such as determining whether contact has occurred (for example, detecting a finger press event), determining whether there is a contact movement and tracking the movement on the entire touch-sensitive surface (for example, detecting a drag or swipe event by one or more fingers), and determining whether the contact has been terminated (for example, detecting a finger lift event or a contact interruption). For example, determining a movement of a contact point may include determining a speed (a value), a velocity (a value and a direction), and/or an acceleration (a change of a value and/or a direction) of the contact point. Based on these values, the smartwatch can identify and/or classify various input types for purposes of navigation through the virtual projection 510.

In FIG. 8, as the second user 300 makes a swiping gesture 800 via the watch face 330 of the smartwatch 310, the smartwatch 310 receives this input and, because the smartwatch is currently serving as an anchor for a virtual projection (see FIGS. 13A and 13B), the input is understood as being directed to the first content 500 as it is rendered via the virtual projection 510. In this case, the swiping gesture 800 (moving in an upward direction) signals a request to 'scroll up'. In response to this input, the first portion 592 that was initially shown is now moved 'upward' and hidden, as illustrated in FIG. 9, while a second portion 992 of the shopping list 590 is now displayed or revealed via the virtual projection 510. The change is also reflected by a new, second indicator 900 ("End of list") presented toward the lower periphery of the virtual projection 510. Thus, an input provided to the touchscreen has been received as a navigation request that affects the visual output presented by the smartglasses. In this way a user can readily interact with virtually generated information using a 'real' (physical) device interface.

As noted earlier, in different embodiments, the virtual projection 510 appears to extend from the watch face 330. This is readily apparent in FIG. 9, where an area of the watch face 330 appears to be disposed in a lower right corner 950 of the virtual projection 510, such that the edges of the two interfaces are approximately aligned. In other words, a bottom edge 336 of the watch face 330 is substantially aligned with a portion of a lower edge 516 of the virtual projection 510, and a first side edge 338 (in this example, the right side) of the watch face 330 is substantially aligned with a portion of a second side edge 518 of the virtual projection 510. Thus, each of the side edge of the virtual projection 510 and the lower edge of the virtual projection 510 appear to extend outward from the watch face 330. In other embodiments, the watch face 330 can appear to be anchored at other peripheral portions of the projection, such as the lower left corner, or the upper left or right corners. The location of the watch face in relation to the projection can vary based on user preferences, the arm on which the watch face is being worn (e.g., detection of the smartwatch on a right wrist results in anchoring of the watch face on the right side of the projection, and detection of the smartwatch on a left wrist results in anchoring of the watch face on the left side of the projection to correspond to the more natural viewing positioning for the user), and/or the shape and size of the projection relative to watch face. In some embodiments, the user can 'move' the virtual projection around the watch face to re-anchor the projection at a different location relative to the watch face.

Figure 10:
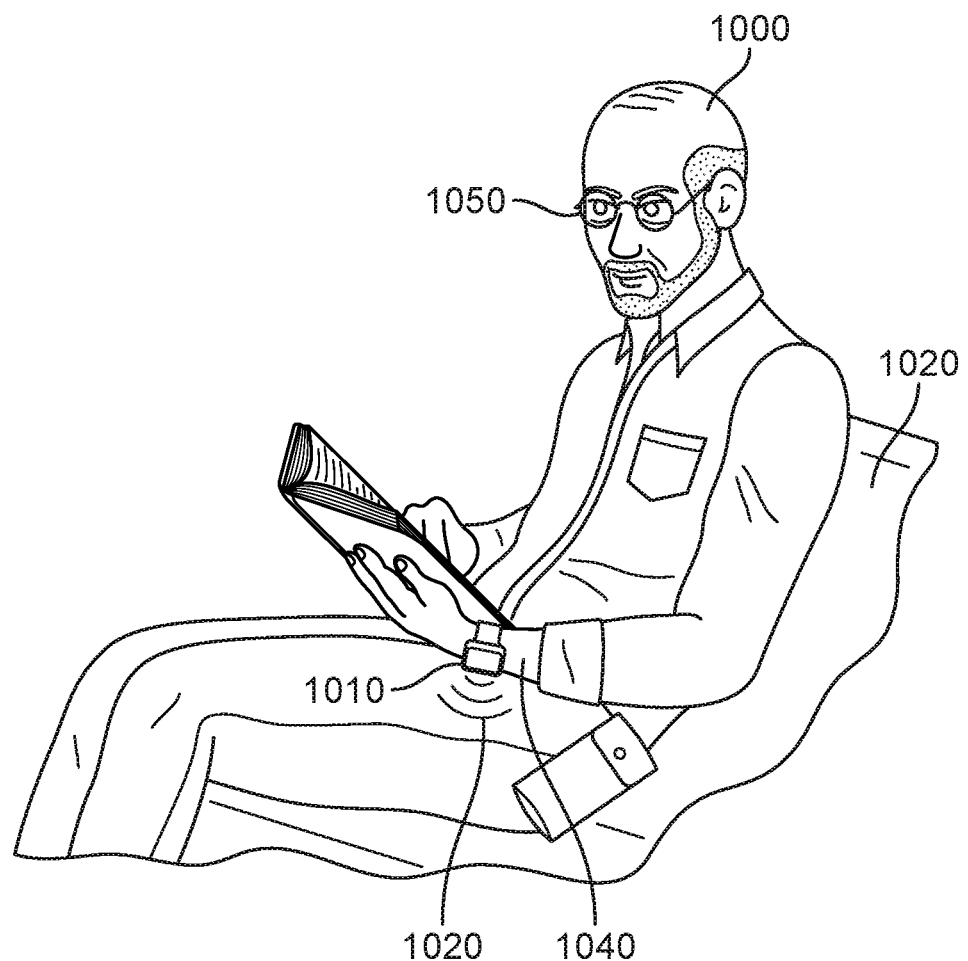
FIG. 10 is an illustration of a user seated on a park bench while wearing a smartwatch, according to an embodiment.
Figure 11:
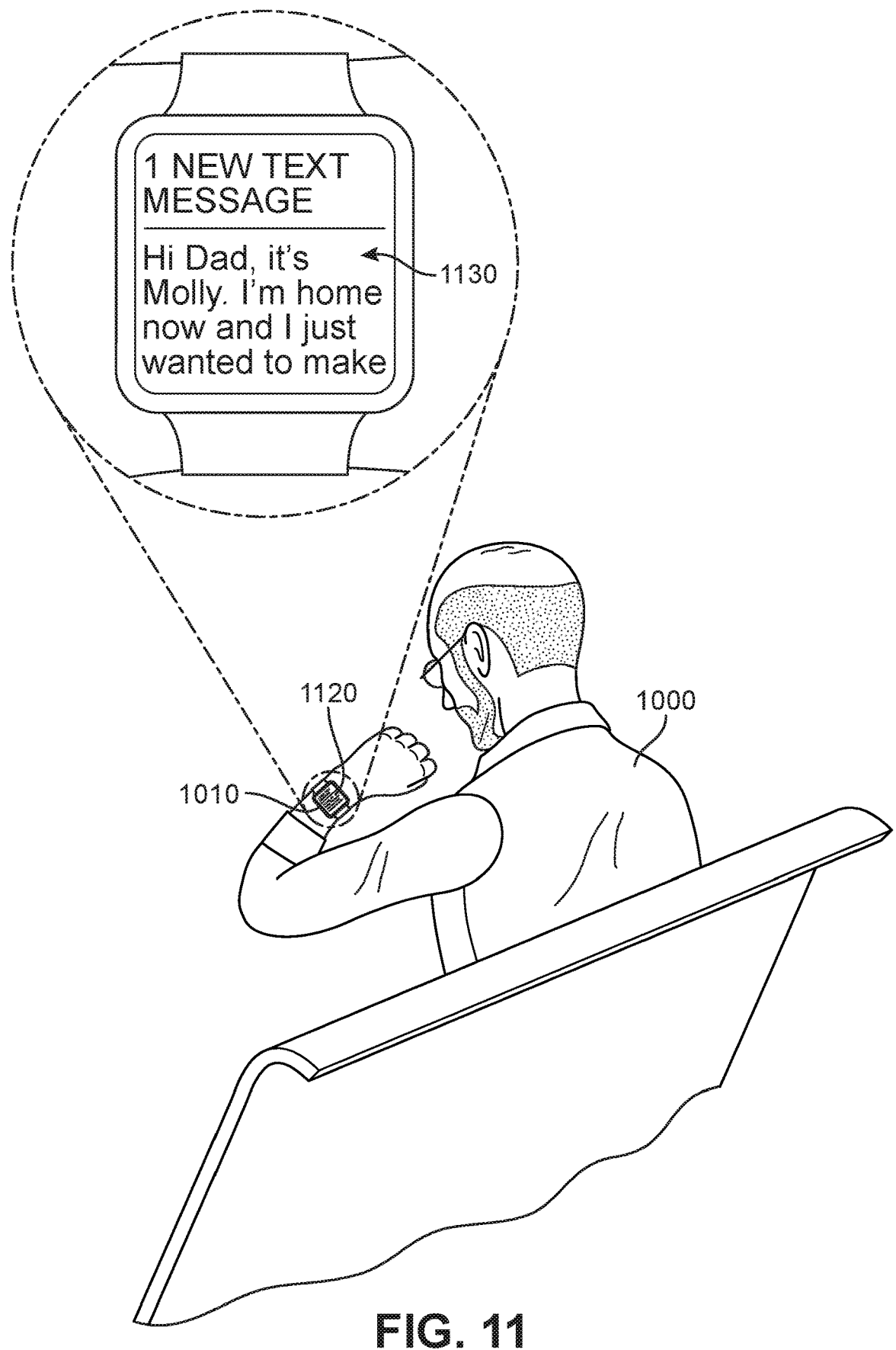
FIG. 11 is an illustration of the user of FIG. 10 receiving an alert for information on their smartwatch, according to an embodiment.

In different embodiments, the system can facilitate visual access to other types of information. Referring now to FIGS. 10-13B, a sequence of drawings illustrate an example of the system being implemented by a user with visual impairments, in this case an elderly person. In FIG. 10, a third user 1000 wearing reading glasses 1050 is depicted seated on a park bench 1002 while reading a book. The third user 1000 is wearing a smartwatch 1010 on his left wrist 1040. While reading his book, a message is received by the smartwatch 1010 and a corresponding alert 1020 is generated (such as a sound or vibration). In FIG. 11, a rear view shows the third user 1000 peering at a watch face 1120 (i.e., a touchscreen display) of his smartwatch 1010 in an attempt to read a message 1130 being displayed. The message 1130 is from his daughter and because of the small screen size of the smartwatch 1010, only a portion of the message 1130 is shown ("Hi Dad, it's Molly. I'm home now and I just wanted to"). The third user 1000 has been provided the smartwatch 1010 by his daughter to help them communicate with each other and to allow his daughter to make sure her father is safe and she can locate him when needed. While a mobile phone device could also have been used, in this case, because of the third user's increasing memory and mobility problems, it was preferable to use a wearable device that was comfortable and familiar for the third user 1000, such as a watch, which he would also be far less likely to misplace, and did not require the user to maintain a secure grasp on while using. However, as noted earlier, the third user 1000 also struggles with his deteriorating sight, and the small screen display makes reading the messages challenging. In addition, because his hands and wrists are trembling (e.g., from muscular weakness), it is difficult to maintain his gaze on the small watch face as it also shakes along with his wrist. To help him address these issues, the third user 1000 has also been provided with an assistive technology device in the form of smartglasses that can work in concert with his smartwatch 1010.

Figure 12A:
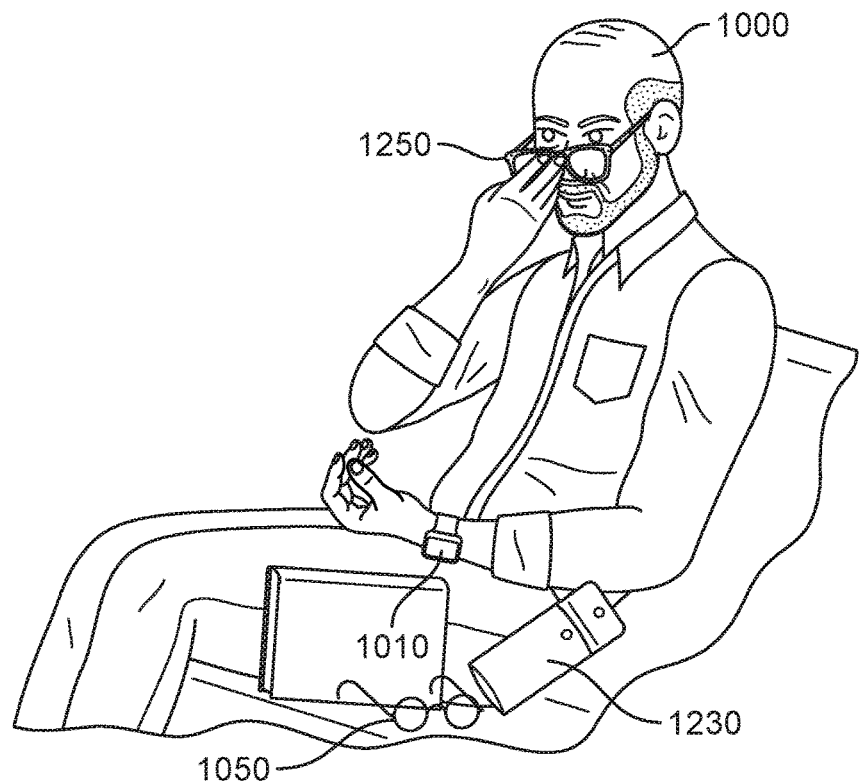
FIG. 12A is an illustration of the user of FIG. 11 reaching for a pair of smartglasses, according to an embodiment.
Figure 12B:
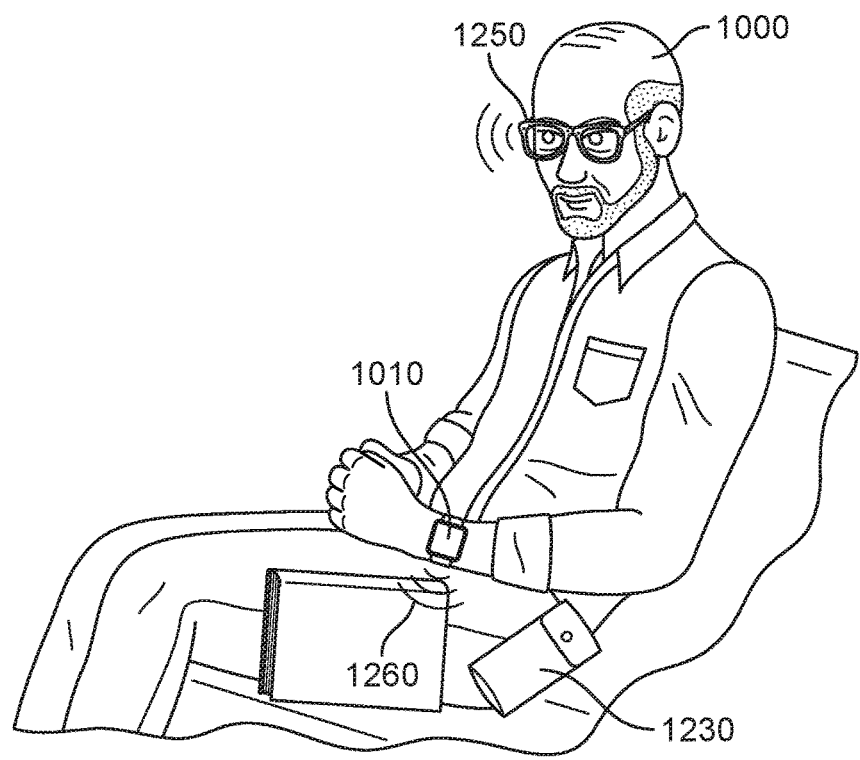
FIG. 12B is an illustration of the user of FIG. 11 connecting the smartglasses to the smartwatch, according to an embodiment.
Figure 13A:
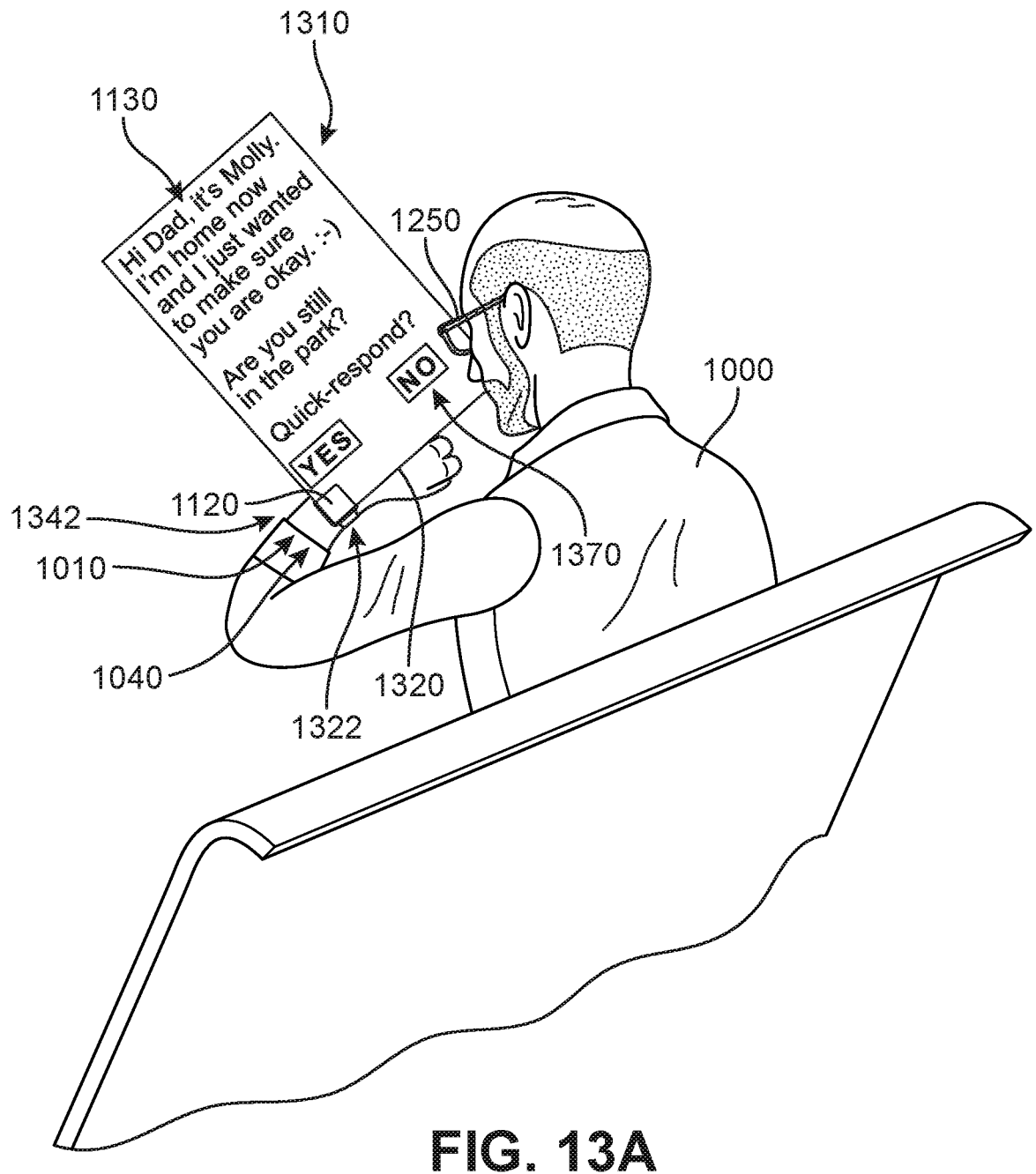
FIG. 13A is an illustration of the user of FIG. 11 viewing a virtual projection comprising a direct message that appears to extend from the screen of the smartwatch, according to an embodiment.

As shown in the sequence of FIGS. 12A and 12B, the third user 1000 removes his own reading glasses 1050 and replaces them with smartglasses 1250 that were secured to his waist in a wearable case 1230. The two devices are synced 1260 in FIG. 12B. In FIG. 13A, the third user 1000 is shown a virtual projection 1310 via smartglasses 1250 that appears to extend outward from the watch face 1120 of the smartwatch 1010. Specifically, the virtual projection 1310 is positioned such that the watch face 1120 is near or 'underneath' a peripheral portion or edge 1320 of the outermost border of the virtual projection 1310. In this case, the watch face 1120 is located 'in' a lower left corner 1322 of the virtual projection 1310, which has a rectangular shape. The message 1130 is now revealed in full ("Hi Dad, it's Molly. I'm home now and I just wanted to make sure you are okay. :-) Are you still in the park?", in a size that is easy for the elder third user 1000 to read. Furthermore, the HMD system of the smartglasses 1250 allows for the presentation of additional rich content options on the same display as the message, here providing a quick-reply mechanism with two selectable options 1370 ("Quick respond? YES NO") that can be chosen by the third user 1000 by a tap gesture in close proximity to or on the region that appears to correspond to either the "YES" or "NO" buttons. Thus, the elderly user need not be faced with the challenge of attempting to respond haltingly to his daughter with his larger, trembling hands through a small watch screen that presents even smaller buttons, and instead can simply move his finger in the direction of a large size button that appears in front of him for a quick tap to stay connected to his family.

As noted earlier, in different embodiments, the system can be configured to anchor the watch face of the smartwatch in a particular location with respect to the virtual projection. For example, a virtual projection can appear to resemble a flat screen display device and may be connected to or "anchor" to a real-world object such as the smartwatch, as shown in the drawings. For purposes of this application, anchoring refers to the configuration in which the virtual projection appears to remain on the anchored surface (here, the watch face) even as the user moves his or her head. Without anchoring, the virtual projection would be expected to move with changes in the user's field of vision or view. However, when the virtual projection is anchored, it will remain pinned or linked to the watch face surface, in a manner similar to how a real-world flat panel television would remain on a wall or table if the user turned his or her head. Furthermore, moving the anchored surface will also result in a corresponding movement of the virtual projection, whether or not the user moves his or her head.

Figure 13B:
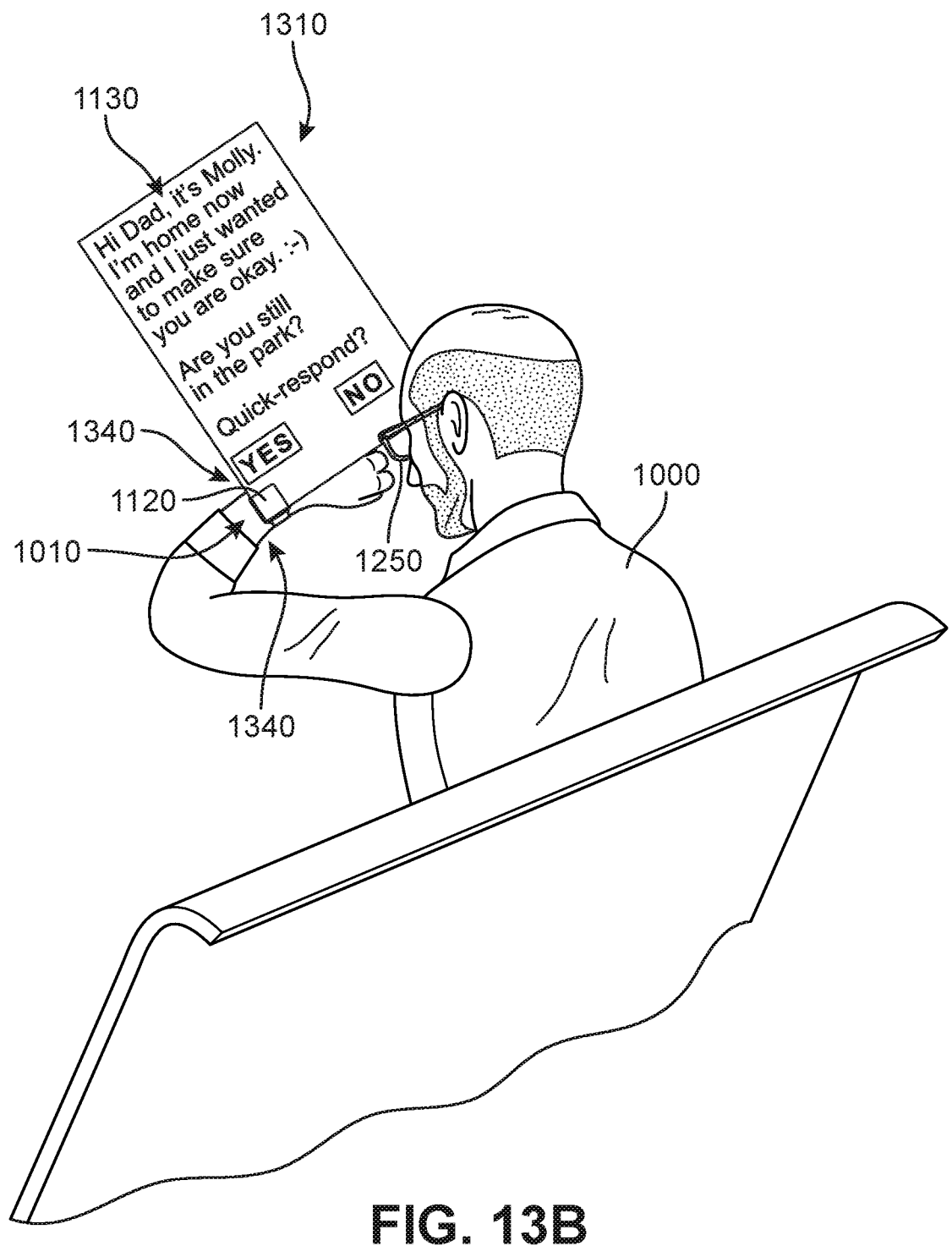
FIG. 13B is an illustration of the user of FIG. 11 viewing the virtual projection that remains anchored when the smartwatch changes position, according to an embodiment.

This arrangement is reflected between FIGS. 13A and 13B, where the third user 1000 has moved his left wrist 1040, such that the watch face 1120 of the smartwatch 1010 shifts in the real-world from a first pose 1340 FIG. 13A to a second pose 1342 in FIG. 13B. In response to this change in pose, the smartglasses 1250 adjust the display accordingly to ensure that the virtual projection 1310 appears to move in concert with the watch face 1020. In other words, the watch face continues to be located at the lower left-hand corner of the virtual projection, despite the change in pose of the watch face, because virtual projection's position is moved in the smartglasses display in order to maintain the spatial relationship between the two that is shown to the user. For purposes of this application, a "pose" of an object refers to its estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector [X, Y, Z, $\theta_x$, $\theta_y$, $\theta_z$]. It can be appreciated that in cases where the user's watch face has a vector that is outside of the user's field of view, and/or the user's wrist is turned such that the watch face is no longer visible, the virtual projection will also be removed, disappear, be abridged, become less solid, or also appear to move outside of the user's field of view with the smartwatch. Similarly, when the smartwatch returns to the user's field of view, the virtual projection will again be visible and appear to extend from the watch face.

While the watch face is occluded or otherwise not visible behind the virtual projection in FIGS. 13A and 13B, seemingly hidden 'behind' the lower left-hand corner of the non-transparent virtual projection, in other embodiments, the watch face may remain visible through a transparent portion of the virtual projection, as shown with respect to FIGS. 3-9. In some other embodiments, the watch face can be replaced or overlaid by an indicator or other virtual symbol or object, or another virtual object representing the watch screen. Furthermore, although the watch face is depicted as being positioned in the lower left-hand corner of the virtual projection in the drawings, in different embodiments, the watch face can be located elsewhere relative to the virtual projection while the two remain in an anchored arrangement. For example, the watch face may be positioned more centrally 'behind' or in the virtual projection, at a different corner, along any portion of the peripheral edge of the virtual projection, and even near an outer edge of the virtual projection. In such cases, movement of either the user's head (resulting in a change in his or her field of view) and/or of the watch face will result in the same spatial relationship being maintained.

Figure 14:
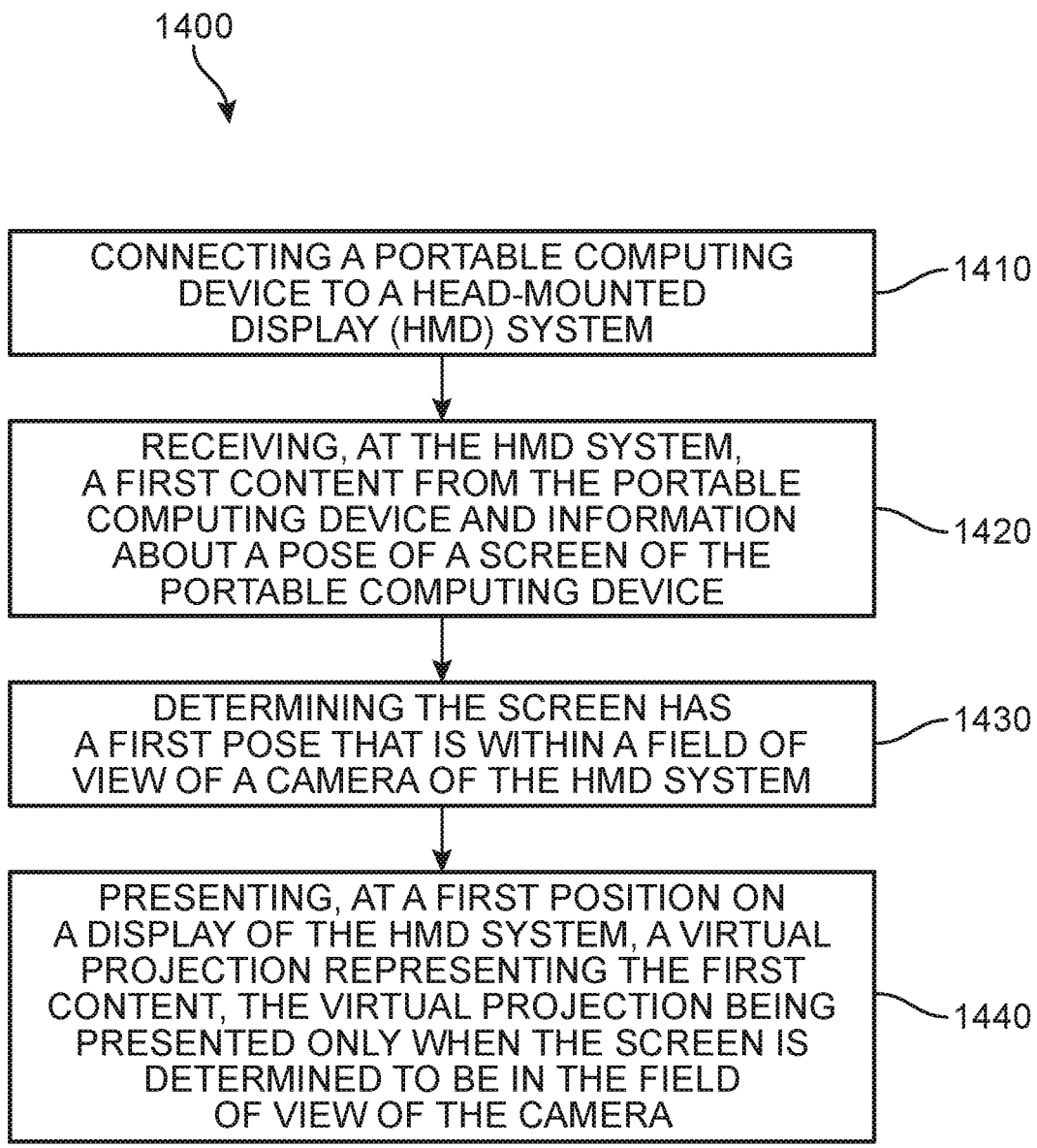
FIG. 14 is a flow chart of a process of accessing content from a portable computing device, according to an embodiment.

FIG. 14 is a flow chart illustrating an embodiment of a method 1400 of accessing content associated with a portable computing device. In a first step 1410 the method includes connecting the portable computing device to a head-mounted display (HMD) system, and in a second step 1420 the method includes receiving, at the HMD system, a first content from the portable computing device and information about a pose of a screen of the portable computing device. The method 1400 also includes a third step 1430 of determining the screen has a first pose that is within a field of view of a camera of the HMD system, and a fourth step 1440 of presenting, at a first position on a display of the HMD system, a virtual projection representing the first content, the virtual projection being presented only when the screen is determined to be in the field of view of the camera In other embodiments, the method may include additional steps or aspects. In one embodiment, the virtual projection is at least partially overlaid on the screen of the portable computing device, and the method further involves changing a position of the virtual projection to a second position in response to a change in position of the HMD system, such that the virtual projection remains overlaid on the screen of the portable computing device. In another embodiment, the virtual projection is overlaid on the screen of the portable computing device, and the method further includes changing a position of the virtual projection to a second position in response to a change in pose of the screen of the portable computing device, such that the virtual projection remains overlaid on the screen. As another example, the virtual projection may have a rectangular outer edge, and a first corner portion of the virtual projection appears to extend from and substantially cover an entirety of the screen of the portable computing device.

In some embodiments, the first content is provided by an application running on the portable computing device. In such cases, the method may further involve receiving, via the HMD system, a first user input for selecting a virtual object of the virtual projection, transmitting the first user input to the portable computing device, and modifying the application in response to the first user input. In addition, the method can include steps of receiving, at the HMD system, a second content from the portable computing device, and updating, on the display of the HMD system, the virtual projection to represent the second content. In some cases, a first size or dimensions of the virtual projection of the first content can differ from a second or dimensions size of the virtual projection of the second content.

In another example, the screen is a touchscreen interface. In such cases, the method can also include receiving, via the touchscreen interface, a first user swiping input for navigating the virtual projection in a first direction, and scrolling, in response to the first user input, the first content presented in the virtual projection on the display of the HMD system in the first direction. In one embodiment, the screen is a touchscreen interface, and the method further involves receiving, via the touchscreen interface, a first user tap input for minimizing the virtual projection, and minimizing the virtual projection in response to the first user tap input. In some cases, the method can also include receiving, via the touchscreen interface, a second user tap input for minimizing the virtual projection, and maximizing the virtual projection in response to the second user tap input. As another example, the method may include steps of presenting a second content on the screen of the portable computing device while the virtual projection is projected, where the second content differs from the first content.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An interactive viewing system for accessing content associated with a portable computing device, the system comprising:
 a processor;
 machine-readable media including instructions which, when executed by the processor, cause the processor to:
  connect the portable computing device to a head-mounted display (HMD) system;
  receive image data from a camera of the HMD system while the portable computing device is in a field of view of the camera;

determine, based on the image data, a pose of the portable computing device relative to the HMD system;

receive, at the HMD system, a first content from the portable computing device; and present, at a first position on a display of the HMD system, a virtual projection representing the first content, the virtual projection being presented only when the portable computing device is determined to be in the field of view of the camera, wherein the first position is determined based on the pose of the portable computing device, and the virtual projection appears to be anchored to the portable computing device such that the virtual projection moves in concert with the portable computing device when changes in the pose of the portable computing device occur.

2. The system of claim 1 wherein the virtual projection is overlaid on a screen of the portable computing device, and the instructions further cause the processor to change a position of the virtual projection to a second position in response to a change in pose of the screen of the portable computing device, such that the virtual projection appears to remain overlaid on the screen when the pose of the screen changes.

3. The system of claim 1, wherein the virtual projection has a rectangular outer edge, and a first corner portion of the virtual projection appears to extend from and substantially cover an entirety of a rectangular screen of the portable computing device.

4. The system of claim 1, wherein the portable computing device is a smartwatch, and the instructions further cause the processor to:

detect whether the smartwatch is being worn on a left wrist or a right wrist;

cause the virtual projection to appear to extend from the smartwatch in a direction associated with a right side of the smartwatch when the smartwatch is detected on the left wrist; and cause the virtual projection to appear to extend from the smartwatch in a direction associated with a left side of the smartwatch when the smartwatch is detected on the right wrist.

5. The system of claim 1, wherein the portable computing device includes a touchscreen interface, and the instructions further cause the processor to:

receive, via the touchscreen interface, a first user swiping input for navigating the virtual projection in a first direction; and scroll, in response to the first user input, the first content presented in the virtual projection on the display of the HMD system in the first direction.

6. The system of claim 5, wherein the instructions further cause the processor to present, on the screen of the portable computing device, one or more visual indicators providing guidance for interacting with the virtual projection via the touchscreen.

7. The system of claim 1, wherein the portable computing device includes a touchscreen interface, and the instructions further cause the processor to:

receive, via the touchscreen interface, a first user tap input for deactivating the virtual projection; and cause a deactivation of the virtual projection in response to the first user tap input.

8. The system of claim 7, wherein the instructions further cause the processor to:

receive, via the touchscreen interface, a second user tap input for re-activating the virtual projection; and cause a re-activation of the virtual projection in response to the second user tap input.

9. The system of claim 1, wherein the instructions further cause the processor to:

receive, at the HMD system, a second content from the portable computing device;

alter an appearance of the virtual projection in order to represent the second content; and automatically expand an apparent size of the virtual projection to accommodate images included in the second content.

10. A method of accessing content associated with a portable computing device, the method comprising:

connecting the portable computing device to a head-mounted display (HMD) system;

receiving image data from a camera of the HMD system while a screen for the portable computing device is in a field of view of the camera;

determining, based on the image data, a pose of the screen relative to a display for the HMD display;

receiving, at the HMD system, a first content from the portable computing device; and presenting a virtual projection rendering at least a portion of the first content via the display of the HMD system only while the screen remains in the field of view of the camera, the virtual projection being anchored to the screen such that the virtual projection appears to maintain a substantially same relative position with the screen when changes in the pose of the screen occur.

11. The method of claim 10, wherein the virtual projection is at least partially overlaid on the screen of the portable computing device.

12. The method of claim 10, wherein the virtual projection appears to extend outward from the screen of the portable computing device.

13. The method of claim 12, further comprising:

presenting a first portion of the first content via the screen of the portable computing device;

presenting a complementary second portion of the first content via the virtual projection; and positioning the virtual projection such that the second portion and the first portion appear as two interlocking display units.

14. The method of claim 10, wherein the virtual projection has a rectangular outer edge, and a first corner portion of the virtual projection appears to extend from and substantially cover an entirety of the screen of the portable computing device.

15. The method of claim 10, wherein the first content is provided by an application running on the portable computing device, and the method further comprises:

receiving, via the HMD system, a first user input for selecting a virtual object of the virtual projection;

transmitting the first user input to the portable computing device;

modifying the application in response to the first user input;

receiving, at the HMD system, a second content from the portable computing device; and updating, on the display of the HMD system, the virtual projection to depict a representation of the second content.

16. The method of claim 15, wherein the first content includes images and the second content includes text, and the method further comprises:

presenting the virtual projection for the first content in a landscape orientation; and changing an orientation of the virtual projection from the landscape orientation to a portrait orientation when the second content is being rendered.

17. The method of claim 10, wherein the first content when presented on the screen of the portable computing device includes only text, and the first content when rendered in the virtual projection includes both text and images.

18. The method of claim 17, wherein the screen is a touchscreen interface, and is configured to function as a trackpad for interacting with the virtual projection.

19. A system comprising:

means for connecting the portable computing device to a head-mounted display (HMD) system;

means for receiving image data from a camera of the HMD system while the portable computing device is in a field of view of the camera;

means for determining, based on the image data, a pose of the portable computing device relative to the HMD system;

means for receiving, at the HMD system, a first content from the portable computing device;

and means for presenting, at a first position on a display of the HMD system, a virtual projection representing the first content, the virtual projection being presented only when the portable computing device is determined to be in the field of view of the camera, wherein the first position is determined based on the pose of the portable computing device, and the virtual projection appears to be anchored to the portable computing device such that the virtual projection moves in concert with the portable computing device when changes in the pose of the portable computing device occur.

* * * * *